United States Patent [19]
Klinkman et al.

[11] 3,751,576
[45] Aug. 7, 1973

[54] PLURAL-CELL DUCT

[75] Inventors: Richard A. Klinkman, New Baden, Ill.; Louis E. Mueller, Fenton, Mo.

[73] Assignee: Mac-Fab Products, Inc., St. Louis, Mo.

[22] Filed: Apr. 13, 1972

[21] Appl. No.: 243,792

[52] U.S. Cl.................................. 174/48, 174/51
[51] Int. Cl............................................. H02g 3/18
[58] Field of Search ................... 174/48, 49, 57, 95, 174/96, 97, 98, 101, 51; 52/220, 221; 220/34

[56] References Cited
UNITED STATES PATENTS

| | | | |
|---|---|---|---|
| 3,303,264 | 2/1967 | Saul et al.............................. | 174/48 |
| 3,514,525 | 5/1970 | Flachbarth et al.................... | 174/49 |
| 3,027,416 | 3/1962 | Kissel................................... | 174/57 |
| 2,297,179 | 9/1942 | Walker ............................ | 174/48 X |
| 3,166,631 | 1/1965 | Reiland............................ | 174/49 X |
| 2,931,533 | 4/1960 | Weismann ....................... | 52/221 X |
| 3,023,265 | 2/1962 | Fork ................................ | 174/57 X |
| 3,417,191 | 12/1968 | Fork ................................. | 174/49 |
| 3,592,956 | 7/1971 | Fork ................................. | 174/49 |

Primary Examiner—Bernard A. Gilheany
Assistant Examiner—D. A. Tone
Attorney—Rey Eilers

[57] ABSTRACT

A plural-cell duct, embedded within a concrete floor, has openings spaced apart along the length thereof; and collars extend upwardly from those openings to help define potential passages extending from the cells of that duct to the surface of that floor. Each of those potential passages has a barrier therein which will effectively isolate one of the cells of that plural-cell duct from an adjacent cell. Whenever a support for an electrical fitting is to be secured to any of those collars, the barrier can be removed from the potential passage through that collar to free substantially the entire cross section of that passage of any -- thereby facilitating the "fishing" of conductors through the plural-cell duct and that collar. Subsequently, a support for an electrical fitting will be secured to the collar; and that support will have a divider which will coact with a partition in the plural-cell duct to restore the isolation of the one cell from the adjacent cell.

38 Claims, 34 Drawing Figures

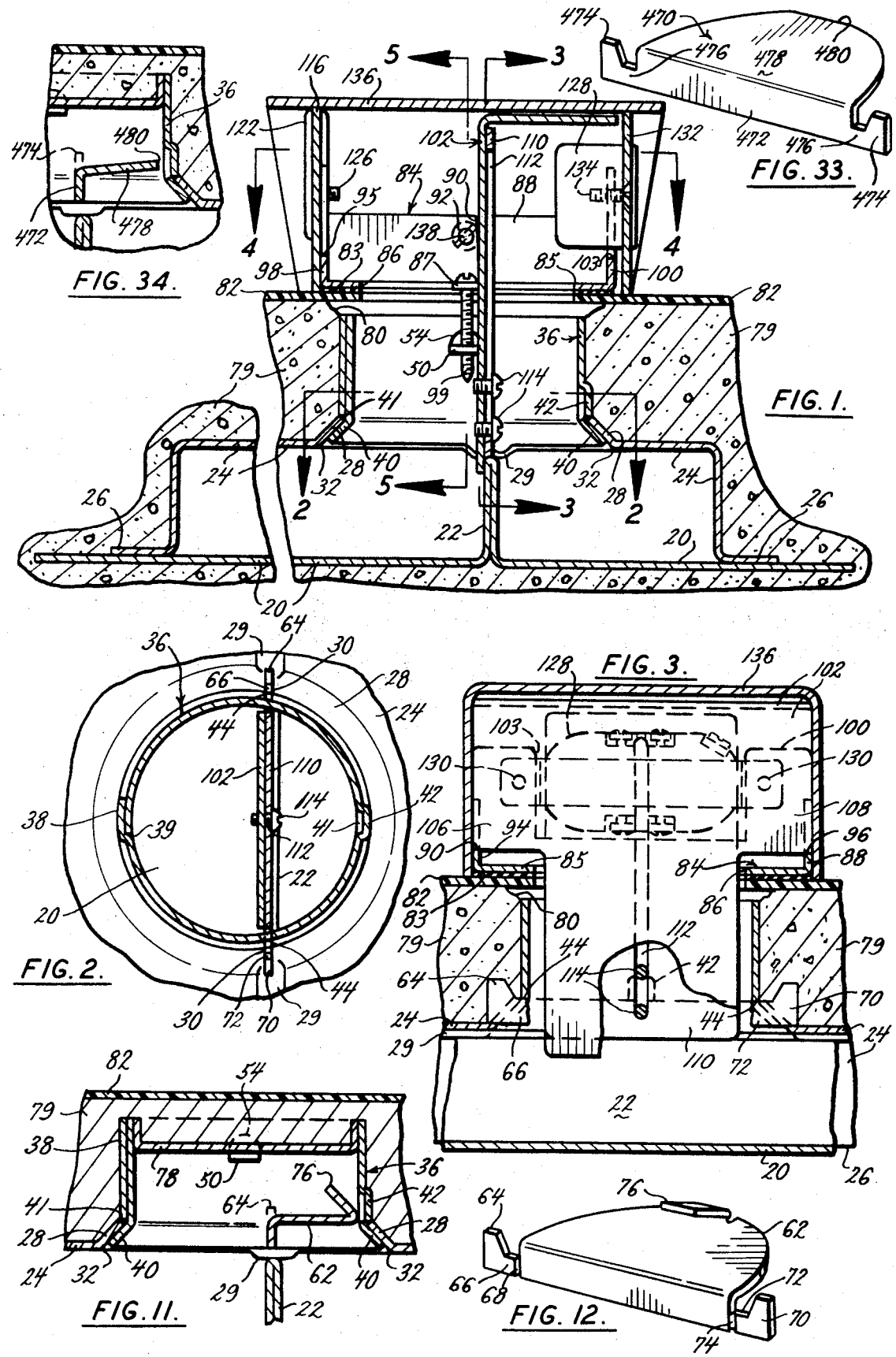

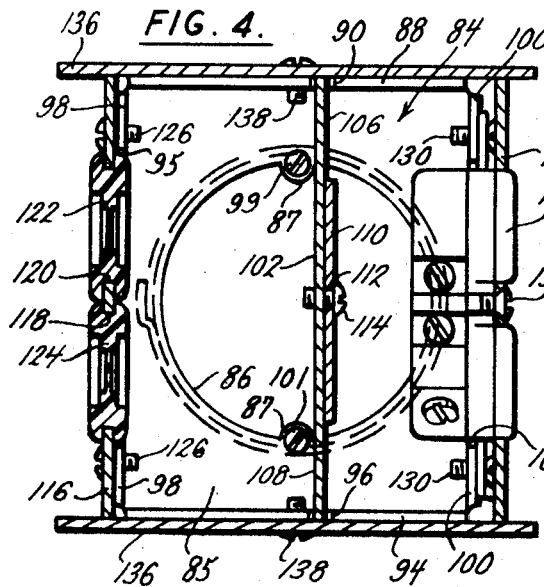
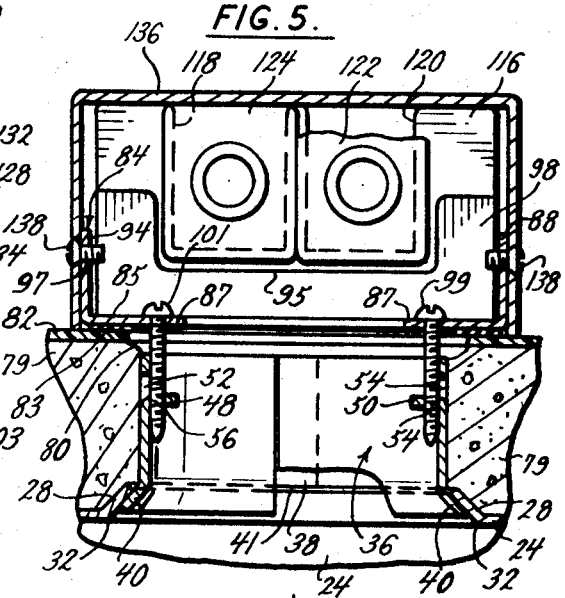
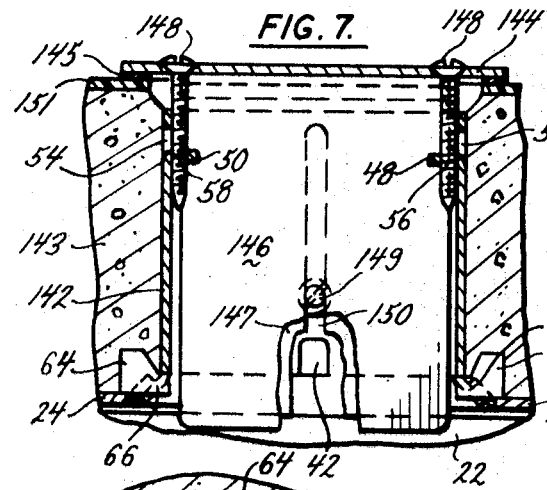
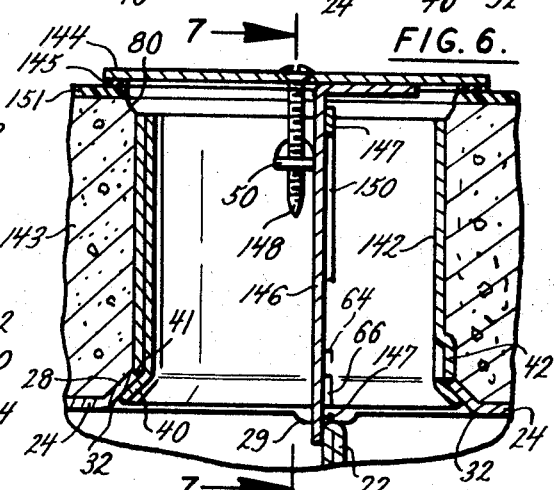
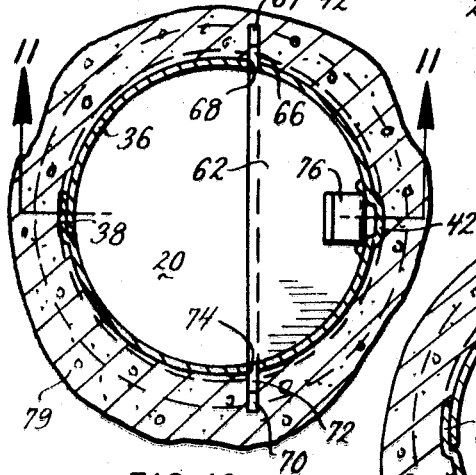
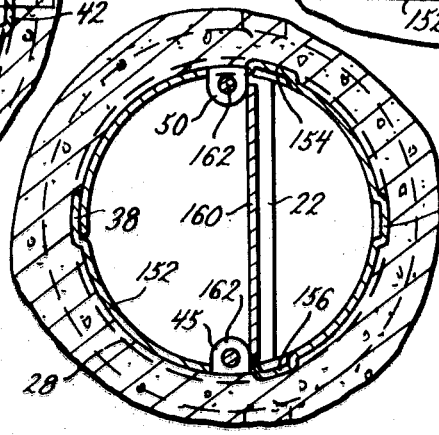

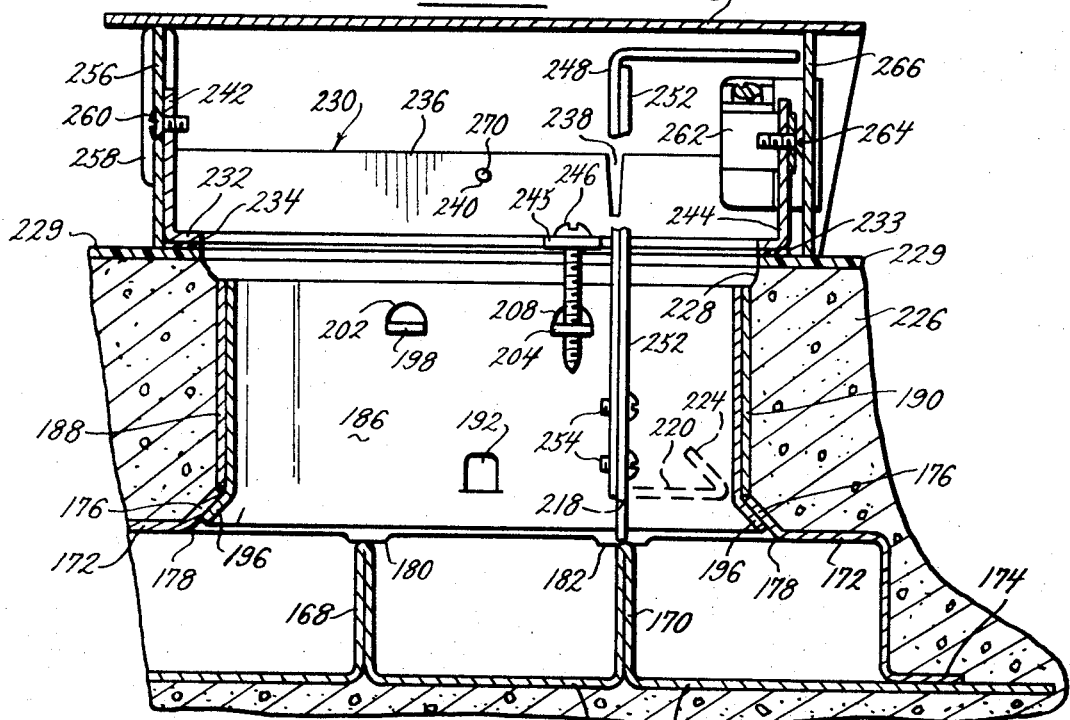

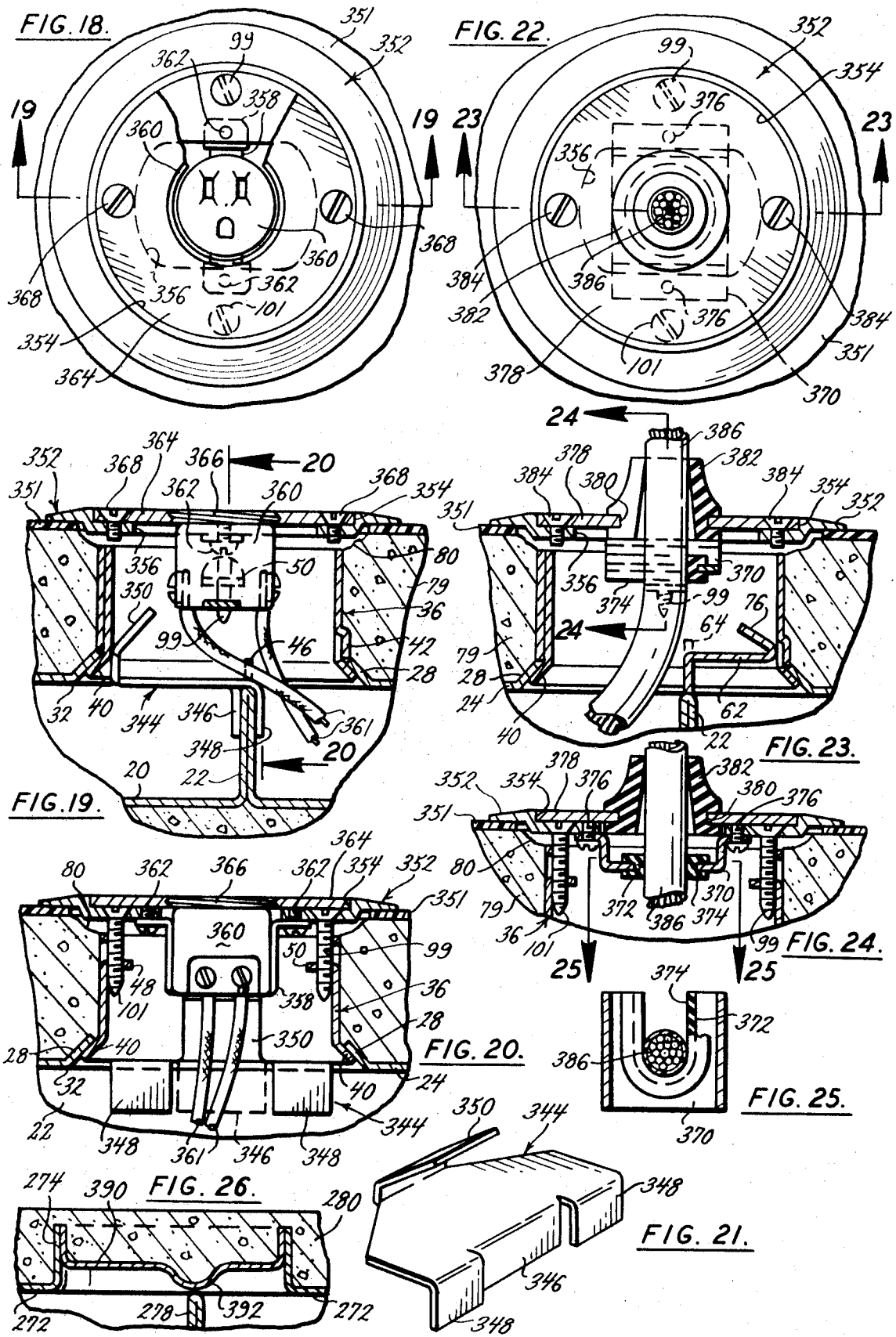

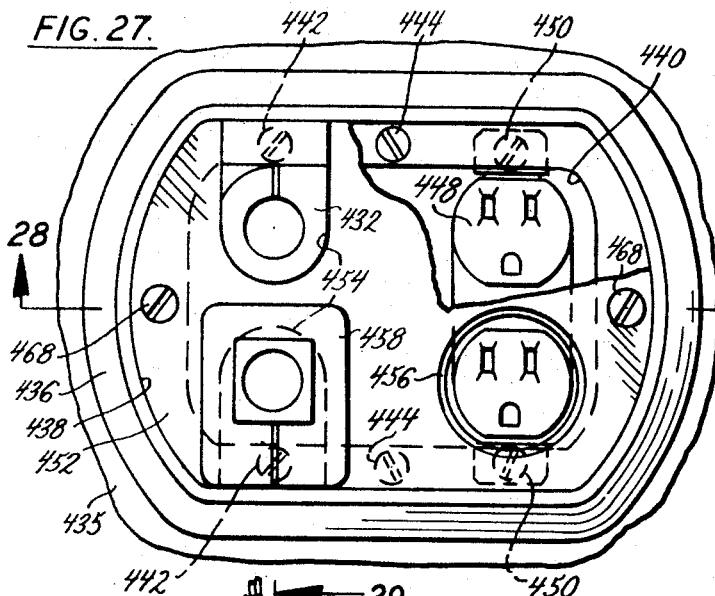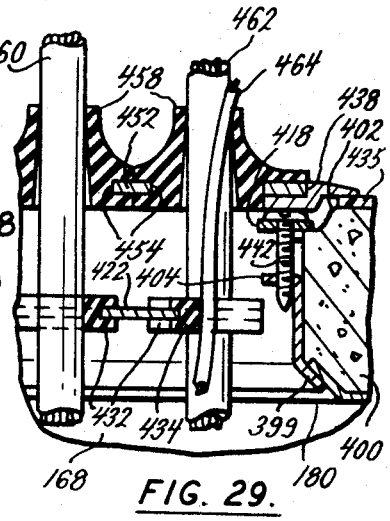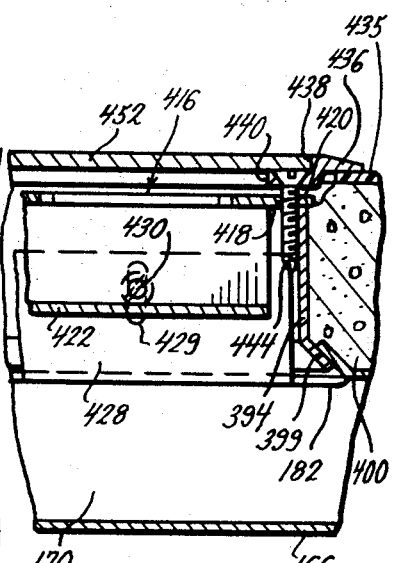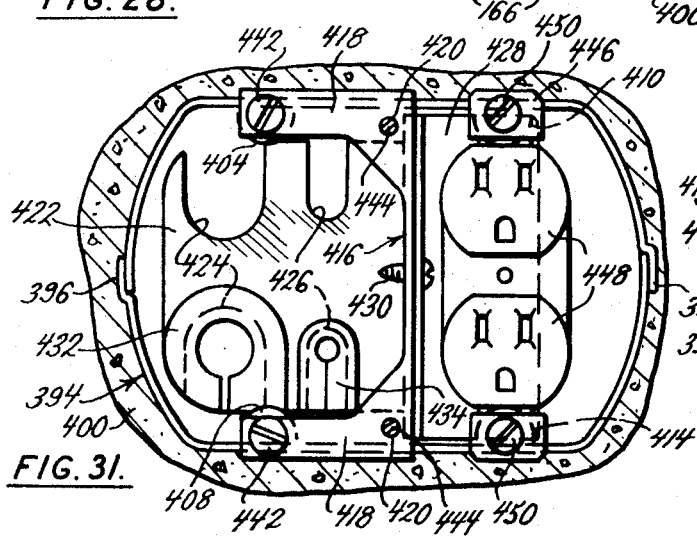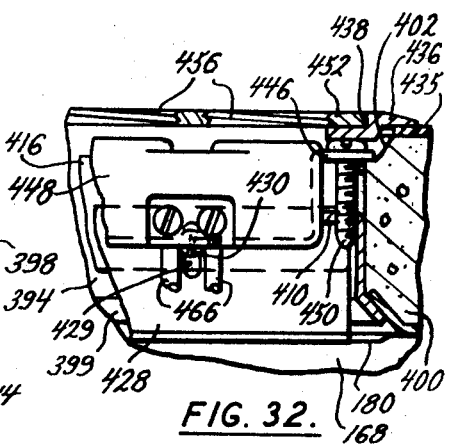

PLURAL-CELL DUCT

This invention relates to improvements in Plural-Cell Ducts. More particularly, this invention relates to improvements in plural-cell ducts which are embedded within concrete floors and which have collars extending upwardly from openings in the upper surfaces thereof to points which are spaced short distances below the upper surfaces of those concrete floors.

It is, therefore, an object of the present invention to provide an improved plural-cell duct with collars which can extend upwardly from openings in the upper surface thereof to points which are spaced short distances below the upper surface of the floor in which that duct will be embedded.

Where a plural-cell duct is embedded within a concrete floor and is equipped with collars which extend upwardly from openings in the upper surface of that duct to points which are disposed short distances below the surface of that floor, it is necessary to isolate one of the cells of that plural-cell duct from an adjacent cell. Such isolation will keep "fishing" tapes, which are being passed through that one cell, from passing out of that one cell and into an adjacent cell. It would be possible to permanently mount a barrier within each of the collars secured to a plural-cell duct; and those barriers would continuously maintain the desired isolation of the one cell from the adjacent cell. However, such barriers would deny workmen full access to the central areas of the collars at the time those workmen were "fishing" conductors through the various cells of the plural-cell duct. Further, because such barriers usually have heights equal to the heights of the collars, the use of such barriers is expensive and wasteful of metal. The present invention makes it possible to isolate one of the cells of a plural-cell duct from an adjacent cell, with minimum cost and minimum usage of metal, and yet makes it possible to free the central areas of the collars of the plural-cell duct from all obstructions when workmen are "fishing" conductors through the cells of that plural-cell duct; and it does so by providing a removable barrier within each potential passage extending upwardly from that plural-cell duct. Until such time as it is removed, each such barrier will effectively isolate one of the cells of the plural-cell duct from an adjacent cell; but once that barrier has been removed, it will completely free the central area of the potential passage through that collar from all obstructions, and will thereby facilitate the "fishing" of conductors through the plural-cell duct. It is, therefore, an object of the present invention to provide a removable barrier within each potential passage extending upwardly from a plural-cell duct which can be removed to completely free the center of that passage from all obstructions.

In one embodiment of the present invention, the barrier is removably secured to the partition within the plural-cell duct; and that barrier can coact with that partition to effectively isolate one of the cells of that plural-cell duct from an adjacent cell. However, when that barrier is separated from that partition, essentially the entire cross section of the potential passage to the cells of that plural-cell duct will be free of obstructions; and hence workmen can work quickly and efficiently as they "fish" conductors through either or both of those cells. It is, therefore, an object of the present invention to provide a barrier which is removably secured to the partition within a plural-cell duct.

In another embodiments of the present invention, the barrier is made part of the lacking member for the collar and plural-cell duct; but that barrier can be broken away from the locking member. As a result, the locking member of that embodiment performs a dual function — removably supporting the barrier and mechanically locking the collar to the plural-cell duct. It is, therefore, an object of the present invention to provide a barrier which is part of the locking member for a collar and plural-cell duct.

The removable nature of the barrier provided by the present invention makes it possible to use a flush-type electrical fitting with any of the collars of a plural-cell duct. Specifically, an electrical fitting can be disposed in the space, within a collar, which normally is occupied by a barrier; and hence the upper surface of that electrical fitting can be set flush with the concrete floor. This is very desirable in locations where an upwardly-projecting electrical fitting would be objectionable. It is, therefore, an object of the present invention to provide a flush-type electrical fitting which can be disposed in the space, within a collar, which normally is occupied by a barrier.

The collar provided by the present invention has the lower end thereof telescoped downwardly through an opening in the upper wall of a plural-cell duct, and then has that lower end flared outwardly to keep any upwardly-directed force, which could be applied to that collar, from separating that collar from that plural-cell duct. Abutments which extend outwardly from the wall of the collar, or ears at the ends of a locking member, overlie the upper wall of the plural-cell duct and prevent any movement of that collar downwardly through the opening in that upper wall. As a result, to fixedly secure the collar to the plural-cell duct, it is only necessary to provide abutments on the wall of the collar or to provide a locking member, to telescope the lower end of the collar downwardly through the opening in the upper wall of the plural-cell duct until the abutments or the locking member abut that upper wall, and then flare the lower edge of the collar outwardly into locking engagement with the under surface of that upper wall. It is, therefore, an object of the present invention to provide a collar for a plural-cell duct which has abutments or a locking member that can abut the upper wall of that plural-cell duct to limit downward movement of that collar relative to an opening in that upper wall, and to form the lower edge of that collar so it can be flared outwardly under that upper wall to lock that collar in position.

Other and further objects and advantages of the present invention should become apparent from an examination of the drawing and accompanying description.

In the drawing and accompanying description, several preferred embodiments of the present invention are shown and described, but it is to be understood that the drawing and accompanying description are for the purpose of illustration only and do not limit the scope of the claims.

BRIEF DESCRIPTION OF THE DRAWINGS

In the drawing

FIG. 1 is a broken, vertical section through a plural-cell duct, through a collar extending upwardly from an opening in the upper wall of that duct, and through a support for an electrical fitting which is secured to that collar, FIG. 2 is a sectional view through the collar of FIG. 1, and it is taken along the plane indicated by the line 2—2 in FIG. 1, FIG. 3 is a partially broken away sectional view through the plural-cell duct, through the collar, and through the support for electrical fitting of FIG. 1, and it is taken along the plane indicated by the line 3—3 in FIG. 1, FIG. 4 is a sectional view through the support for electrical fitting of FIG. 1, and it is taken along the plane indicated by the line 4—4 in FIG. 1, FIG. 5 is a partially broken away sectional view through the plural-cell duct, through the collar, and through the support for electrical fitting of FIG. 1, and it is taken along the plane indicated by the line 5—5 in FIG. 1, FIG. 6 is a vertical section through another and greater-height collar which is used with the plural-cell duct of FIG. 1 and which has a divider-equipped closure thereon, FIG. 7 is a partially broken away sectional view through the collar and closure of FIG. 6, and it is taken along the plane indicated by the line 7—7 in FIG. 6, FIG. 8 is a sectional view through a shorter-height collar and a divider-equipped closure therefor, FIG. 9 is a sectional view through the collar of FIG. 8, and it is taken along the plane indicated by the line 9—9 in FIG. 8, FIG. 10 is a horizontal section through the collar of FIG. 1 before the barrier of that collar is removed, FIG. 11 is a sectional view through the collar of FIG. 1, and it is taken along the plane indicated by the line 11—11 in FIG. 10, FIG. 12 is a perspective view of the removable barrier of FIGS. 10 and 11, FIG. 13 is a vertical section through a further plural-cell duct and collar and support for electrical fitting, FIG. 14 is a plan view of the collar of FIG. 13 before the support for electrical fitting is secured to that collar, FIG. 15 is a vertical section through a still further plural-cell duct, collar and support for electrical fitting, FIG. 16 is a sectional view through the plural-cell duct and collar and support for electrical fitting of FIG. 15, and it is taken along the broken plane indicated by the broken line 16—16 in FIG. 15, FIG. 17 is a perspective view of the divider which is disposed within the collar of FIGS. 15 and 16, FIG. 18 is a partially broken away plan view of a flush-type electrical fitting disposed within the collar of FIG. 1, FIG. 19 is a sectional view through the flush-type electrical fitting of FIG. 18 and of the collar and plural-cell duct below that flush-type electrical fitting, and it is taken along the plane indicated by the line 19—19 in FIG. 18, FIG. 20 is a sectional view through the flush-type electrical fitting and collar and plural-cell duct of FIG. 19, and it is taken along the broken plane indicated by the broken line 20—20 in FIG. 19, FIG. 21 is a perspective view of the barrier used in the collar of FIGS. 19 and 20, FIG. 22 is a plan view of another flush-type electrical fitting disposed within the collar of FIG. 1, FIG. 23 is a sectional view through the flush-type electrical fitting of FIG. 22 and through the collar and part of the plural-cell duct below that collar, and it is taken along the plane indicated by the line 23—23 in FIG. 22, FIG. 24 is a sectional view through the flush-type electrical fitting of FIG. 22 and through the collar below that fitting, and it is taken along the plane indicated by the line 24—24 in FIG. 23, FIG. 25 is a sectional view through a strap in FIGS. 23 and 24, and it is taken along the plane indicated by the line 25—25 in FIG. 24, FIG. 26 is a vertical section through the collar of FIGS. 15 and 16 and through a removable U-shaped closure for that collar, FIG. 27 is a partially broken away plan view of a flush-type electrical fitting for a collar similar to the collar of FIGS. 13 and 14, FIG. 28 is a sectional view through the flush-type electrical fitting of FIG. 27 and through the collar and plural-cell duct below that flush-type fitting, and it is taken along the plane indicated by the line 28—28 in FIG. 27, FIG. 29 is a sectional view through the flush-type electrical fitting and collar of FIG. 28, and it is taken along the broken plane indicated by the broken line 29—29 in FIG. 28, FIG. 30 is a sectional view through the flush-type electrical fitting and collar and plural-cell duct of FIG. 28, and it is taken along the plane indicated by the line 30—30 in FIG. 28, FIG. 31 is a sectional view through the flush-type electrical fitting and collar of FIG. 28, and it is taken along the plane indicated by the line 31—31 in FIG. 28, FIG. 32 is a sectional view through the flush-type electrical fitting and collar of FIG. 28, and it is taken along th plane indicated by the line 32—32 in FIG. 28, FIG. 33 is a perspective view of another removable barrier provided by the present invention, and FIG. 34 is a fragmentary sectional view through the barrier of FIG. 33 and through a collar in which that barrier is mounted.

DETAILED DESCRIPTION OF THE PREFERRED EMBODIMENTS

Referring particularly to FIGS. 1—5 and 10—12, the numeral 20 denotes a flat metal plate which has a partition 22 that projects upwardly from the upper surface thereof and that extends along the length of that plate. As shown particularly by FIG. 1, that partition is formed by a re-entrant bend in that metal plate. The numeral 24 denotes an elongated metal plate which has the sides thereof bent downwardly to define a channel, and which has outwardly-directed flanges 26 at the bottoms of those sides. The metal plate 24 defines the side walls and upper wall of a plural-cell duct, and the plate 20 defines the bottom wall of that plural-cell duct. The partition 22 subdivides that plural-cell duct into two cells; and the left-hand cell can accommodate the cables or conductors of a telephone system, the cables or conductors of an intercommunication system, or the cables or conductors of any other system which is connected to a low-voltage power source. The right-hand cell of the plural-cell duct can accommodate the cables or conductors of a power-supplying system, such as the power-supplying systems which supply one hundred and ten volts or two hundred and twenty volts to electrical fittings distributed throughout a building. The outwardly-extending flanges 26 at the bottoms of the sides of the metal plate 24 will usually be spotwelded to the metal plate 20 to permanently secure metal plates together.

The metal plate 24 has a number of circular openings therein, and those openings usually are spaced apart equal distances. Each of those circular openings is defined by a frusto-conical upwardly-directed flange 28 on the plate 24. The lower surface of each frusto-conical flange 28 is gently rounded, as indicated by the numeral 32, to minimize any abrasion of conductors or cables which may be pulled upwardly through the opening defined by that frusto-conical flange. The numeral 29 denotes a downwardly-directed offset in the metal plate 24; and that downwardly-directed offset extends along the length of that metal plate. That downwardly-directed offset is in register with the upper edge of the partition 22; and it will coact with that upper edge to isolate the two cells of the plural-cell duct at all points along the length of the plate 24 which are spaced from the openings defined by the frusto-conical flange 28 and its counterparts. The numeral 30 denotes two vetically-directed slots which are formed in the frusto-conical flange 28; and those slots are shown in FIG. 2.

The numeral 36 generally denotes a collar which is circular in cross section. That collar is formed from sturdy sheet metal, and it preferably is formed by the method disclosed in application Ser. No. 243,648 for Method Of Making Collar which was filed by Louis E. Mueller on Apr. 13, 1972. An axially-directed, circumferentially-extending offset 38 is displaced radially outwardly of the rest of the collar 36 by a shoulder 39; and that offset is adjacent one edge of the sheet metal blank used in making that collar, and it overlies the opposite edge of that sheet metal blank, as shown particularly by FIG. 2. That offset preferably is spot-welded to that opposite edge of that sheet metal blank; and it overlies and engages a portion of the frusto-conical flange 28 on the metal plate 24.

The numeral 40 denotes a frusto-conical outwardly- and downwardly-directed flange at the lower edge of the collar 36; and, as shown particularly by FIG. 1, that flange underlies and intimately engages the frusto-conical flange 28 on the upper wall of the metal plate 24. That frusto-conical flange will positively prevent upward movement of the collar 36 relative to the plural-cell duct constituted by the metal plates 20 and 24. As indicated particularly by FIG. 1, a notch 41 is provided at the lower end of the offset 38; and, because of that notch, all portions of the offset 38 are disposed upwardly of the frusto-conical flange 40 at the lower edge of the collar 36.

The numeral 42 denotes an abutment which is located adjacent the upper edge of the frusto-conical flange 40 at the lower edge of the collar 36. That abutment is slightly narrower than the offset 38, it is much shorter than that offset, and it is located at the opposite end of a diameter, of the collar 36, which passes through that offset. The abutment 42 overlies and engages a portion of the frusto-conical flange 28 on the metal plate 24. Consequently, that abutment will coact with the offset 38 to prevent downward movement of the collar 36 relative to the plural-cell duct constituted by the metal plates 20 and 24.

The numeral 44 denotes vertically-directed slots in the frusto-conical flange 40 at the lower edge of the collar 36; and those slots are in register with the slots 30 in the frusto-conical flange 28, a shown by FIG. 2. A generally semi-circular ear 48 is punched inwardly of the wall of the collar 36, as shown by FIG. 5; and a generally semi-circular opening 52 is formed in that wall during the inward punching of that ear. A vertically-directed opening 56 is provided in the ear 48; and that opening has one edge thereof immediately adjacent the inner surface of the collar 36, as indicated by FIG. 5. The numeral 50 denotes a second genera'ly semi-circular ear which is punched inwardly of the wall of the collar 36; and that ear is at the end of a diameter, of that collar, which passes through the ear 48. A generally semi-circular opening 54 is formed in the wall of the collar 36 during the inward punching of the ear 50. A vertically-directed opening 58 is immediately adjacent the inner surface of the collar 36, as indicated particularly by FIG. 5.

FIG. 12 shows a barrier 62 which is generally L-shaped in side elevation; and that barrier has an ear 64 connected thereto by a reduced-height connecting portion 66 and a reduced-thickness portion 68. A second ear 70 is connected to the opposite side of the barrier 62 by a reduced-height connecting portion 72 and a reduced-thickness portion 74. The reduced-height sections 66 and 72 are disposed within the aligned slots 30 and 44, respectively, at opposite sides of the frusto-conical flange 28 and of the frusto-conical flange 40. The reduced-thickness portions 68 and 74 are disposed adjacent the inner surface of the collar 36. The reduced-thickness portions 68 and 74 are strong enough to maintain the barrier 62 in assembled relation with the reduced-height connecting portions 66 and 72 during the manufacture of that barrier, during the assembling of that barrier with the collar 36, during the assembling of that collar with the plural-cell duct, and during the storage, shipment, and installation of that plural-cell duct. However, those reduced-thickness portions are made weak enough so a firm pull, applied to a tab 76 at the free edge of that barrier, will cause the barrier to break away from the reduced-height connecting portions 66 and 72, as indicated by FIG. 3.

The ears 64 and 70 overlie the metal plate 24, as shown particularly by FIG. 3, and hence those ears coact with the offset 38 and the abutment 42 to prevent downward movement of the collar 36 relative to the plural-cell duct constituted by the metal plates 20 and 24. Those ears also fill the slots 30 and 44 in the frusto-conical flanges 28 and 40, respectively; and hence those ears mechanically block rotation of the collar 36 relative to the metal plate 24. As a result, the barrier 62 and the ears 64 and 70 act as a combination barrier and locking member. Even after the barrier 62 has been broken away, the ears 64 and 70 will continue to function as locking members.

The numeral 78 in FIG. 11 denotes a cup-like closure which is dimensioned to fit down into the upper end of the collar 36. The generally-cylindrical wall of that cup-like closure will have a press fit in the upper part of that collar; and hence that closure will not become accidentally separated from that collar. Also that generally-cylindrical wall will engage the inner surface of the collar 36 so tightly that essentially no concrete will be able to pass downwardly along the inner surface of that collar. Moreover, that generally-cylindrical wall will effectively close the opening 54 which was formed in the wall of the collar 36 as the ear 50 was formed and also will effectively close the opening 52 which was formed in that wall as the ear 48 was formed. The engagement between the generally-cylindrical wall of the closure 78 and the collar 36 is so tight that a workman usually will drive the point of a punch or screwdriver through the web of that closure, and then apply a prying force to that punch or screwdriver to separate that closure from that collar.

The collar 36 will usually be fabricated as a component which is separate from the plural-cell duct, the closure 78 and the barrier 62; but, after that collar has been fabricated, the connecting portions 66 and 72 of the barrier 62 will be telescoped upwardly into the slots 44 in the lower edge of that collar. Thereupon, the connecting portions 66 and 72 will be aligned with the slots 30 in the fursto-conical flange 28 on the metal plate 24, and the lower edge of the collar 36 will be telescoped downwardly through the opening defined by that frusto-conical flange. As the connecting portions 66 and 72 are telescoped downwardly into the slots 30, the outer portions of the lower surfaces of the ears 64 and 70 will engage the upper surface of the metal plate 24. Consequently, the outer portions of those lower surfaces will help prevent movement of the collar 36 downwardly relative to the metal plate 24. Also, those outer portions of those lower surfaces will coact with the lower edges of the offset 38 and of the abutment 42 to provide four-point support for the collar 36.

While a suitable die is holding the outer portions of the lower surfaces of the ears 64 and 70 solidly in engagement with the upper surface of the metal plate 24, and also is holding the lower surfaces of the offset 38 and of the abutment 42 against the upper edge of the frusto-conical flange 28, a punch will be passed upwardly between the side walls of the metal plate 24 and will cold-flow the lower edge of the collar 36 to form the frusto-conical flange 40. Thereafter, that frusto-conical flange will coact with the engagement between the upper wall of the plate 24 and the ears 64 and 70 and with the engagement between the upper edge of the frusto-conical flange 28 and the offset 38 and the abutment 42 to mechanically and positively lock the collar 36 to that metal plate. At such time, the flanges 26 of the metal plate 24 will be welded or otherwise secured to the metal plate 20; and, thereupon, the upper edge of the partition 22 will engage the downwardly-bent portion 29 of the metal plate 24 to effectively isolate the left-hand cell from the right-hand cell of the plural-cell duct defined by the metal plates 20 and 24.

Where the openings, defined by the frusto-conical flange 28 and similar frusto-conical flanges, would tend to place the two cells of the plural-cell duct in communication with each other via a collar 36, the barrier 62 will block any such communication, as indicated by FIG. 11. In this way the barrier 62 will coact with the portion of the partition 22 adjacent the collar 36 to effectively isolate the two cells of the plural-cell duct formed by the metal plates 20 and 24. The cup-shaped closure 78 can be pressed into the upper end of the collar 36 before or after that collar is assembled with the metal plate 24, as desired.

The collar 36 can be made in various heights in the range of 1 ⅞ inches to 6 inches; and, preferably, the heights within that range will differ by one-eighth of an inch. The particular height selected for any given collar will be determined by the scheduled thickness of the concrete floor. In practice, the upper edges of the various collars 36 will be spaced about a quarter of an inch below the anticipated level of the upper surface of the concrete floor. Once the various sections of a plural-cell duct have been interconnected and set in position, the concrete of the floor 79 will be cast. Virtually none of that concrete will be able to enter the plural-cell duct; because the generally-cylindrical portion of the closure 78 tightly engages the inner surface of the collar 36 and also effectively closes the openings 52 and 54 in the wall of that collar, and because the joint between the frusto-conical flanges 28 and 40 is a tight joint. Additionally, the engagements between the reduced-height connecting portions 66 and 72 and the slots 30 and 44 in the frusto-conical flange 28 and 40, respectively, are so intimate that virtually no concrete will be able to pass through those slots. Although the concrete will be effectively excluded from the collars 36 and the plural-cell duct, that concrete will overlie the tops of those collars and will fill the closures 78, as indicated particularly by FIG. 11. Moreover, a floor covering 82, usually in the form of wide sheets or individual tiles, will overlie the concrete of the floor 79.

After the building of which the floor 79 is a part has been erected, and when it is time to install the electrical system, the telephone system, the intercommunication or the control system, a limited number of the collars 36 will be selected as the collars through which cables or conductors will be brought up through the floor 79. Once those collars have been selected and located, workment will use cold chisels or other tools to break away the concrete overlying those collars and the closure 78 for those collars. The resulting broken-away portions of the floor 79 can have the configurations indicated by the numeral 80 in FIGS. 1, 3 and 5.

Once the overlying concrete has been removed, the workmen will use punches, screwdrivers, or the like to pierce the closures 78 and to pry those closures out of the upper ends of the collars 36. Thereafter, the workmen will insert the jaws of pairs of pliers or other tools downwardly through the collars to grip the tabs 76 on the barriers 62. Firm upward pulls on those tabs should break the reduced-thickness portions 68 and 74 to free those barriers. However, if strong upward pulls do not immediately break those reduced-thickness portions, a few applications of upwardly-directed and downwardly-directed forces to the tabs 76 will quickly break those reduced-thickness portions and thereby free the barriers 62. The ears 64 and 70 will be solidly held by the concrete of the floor 79; and hence those ears and the reduced-height connecting portions 66 and 72 will remain locked in the slots 30 and 44 of the frusto-conical flanges 28 and 40.

After the barriers 62 have been removed from the collars 36, the entire central areas of those collars will be wholly free of obstructions. Consequently, the workmen will find it very easy to "fish" cables or conductors through either of the cells of the plural-cell duct, and to pull those cables or conductors up through the selected collars 36. As the "fishing" tapes are being passed through those cells, the ends of those "fishing" tapes may tend to rise upwardly and may attempt to enter collars other than the selected collars 36. The ends of those "fishing" tapes will not be able to move upwardly into those other collars or to ride up over the partition 22 and pass into the adjacent cell, because the barriers 62 within those other collars 36 will effectively keep those ends of those "fishing" tapes from doing so. In being located close to the lower end of the collar 36, the barrier 62 of FIGS. 10-12 avoids the frustrations and delays which could occur if the ends of the "fishing" tapes were able to rise upwardly into the intermediate or upper portions of that collar and jam against a vertically-directed barrier which was permanently mounted within that collar.

The "fishing" tapes will be used to pull the cables or conductors downwardly through some of the selected collars 36, through portions of a cell of the plural-cell duct, and then upwardly through other of the selected collars 36. Because the lower surfaces, of the various frusto-conical flanges 28 on the metal plate 24, are gently rounded, as indicated by the numeral 32, the cables or conductors will experience little or no abrasion or wearing of the exteriors thereof as they are pulled downwardly and upwardly through the selected collars 36. Sufficiently-long lengths of the cables or conductors will be permitted to extend beyond the upper ends of the selected collars 36 to enable the workmen to make the required connections to those cables or conductors.

The numeral 84 in FIGS. 1 and 3–5 generally denotes a support for an electrical fitting; and that support is an outlet box which is secured to a collar 36. A circular opening 86 is provided in the floor 85 of that support; and that opening is in register with the collar 36 and with an opening in the floor covering 82, as indicated particularly by FIG. 1. The opening 86 is circular in plan view; but it has semi-circular ears 87 which extend inwardly at opposite ends of a diameter thereof. Those semi-circular ears will be in register with, and will be similar to, the ears 48 and 50 at the inner surface of the collar 36. Each of the ears 87 has a vertically-directed opening therein; and those openings are in register with the openings 56 and 58, respectively, in the ears 48 and 50. A resilient gasket 83 is shown intermediate the floor 85 of the support 84 and the floor covering 82. That gasket has an opening which has the same configuration as the opening 86 in the floor 85 of the support 84; and that gasket will keep any water which is spilled or mopped onto the floor covering 82 from reaching, and passing downwardly through, the collar 36.

The support 84 has a side wall 88 with a narrow slot 90 extending downwardly from the upper edge thereof; and that slot has the walls thereof slightly tapered so the bottom thereof is narrower than the top thereof. A threaded opening 92 is provided in the wall 88, as indicated particularly by FIGS. 1 and 5. The support 84 has a second side wall 94 with a slot 96 therein; and the slot 96 is similar to, and is in register with, the slot 90 in the wall 88, as indicated by FIG. 4. Also, the side wall 94 has a threaded opening 97 therein, as indicated by FIG. 5; and that opening is in register with the threaded opening 92. The numeral 98 denotes one of the end walls of the support 84; and a wide notch 95 extends downwardly from the upper edge of that wall to make that wall U-shaped in elevation, as indicated by FIG. 5. The numeral 100 denotes the opposite end wall of the support 84; and a wide notch 103 extends downwardly from the upper edge thereof to make that wall U-shaped in elevation.

A self-tapping screw 99 extends downwardly through the opening in one of the ears 87 and through the opening 58 in the ear 50 on the collar 36. Because one edge of the opening 58 is immediately adjacent the inner surface of the collar 36, the thread of that self-tapping screw will bite into the inner surface of that collar. The head of that self-tapping screw will be tightened down into intimate engagement with the ear 87; and the threads of that screw will intimately engage the metal of the ear 87 and of the ear 50. The overall result is that the screw 99 will effectively "ground" the support 84 to the collar 36, and thus to the plural-cell duct. The numeral 101 denotes a similar screw which extends downwardly through the opening in the other ear 87 of the support 84 and through the opening 56 in the ear 48. The thread of that screw will bite into the inner surface of the collar 36, the head of that screw will intimately engage the ear 87, and the thread of that screw will intimately engage the metal of the ear 87 and of the ear 48. Consequently, the screw 101 also will effectively "ground" the support 84 to the collar 36, and thus to the plural-cell duct. By enabling both of the screws 99 and 101 to effectively "ground" the support 84 to the collar 36, the present invention provides a double factor of safety for the "grounding" of that support.

The numeral 102 generally denotes the stationary part of a divider which has a vertically-directed portion and a horizontally-directed portion, as shown particularly by FIG. 1. Wings 106 and 108 extend outwardly beyond the opposite sides of the stationary part 102 of the divider, as shown particularly by FIG. 3; and the wing 106 has the lower portion of the outer edge thereof disposed within the slot 90 in the wall 88 of the support 84, while the wing 108 has the lower portion of the outer edge thereof disposed within the slot 96 in the wall 94 of that support. The thicknesses of the wings 106 and 108 are less than the widths of the upper portions of the slots 90 and 96 in the walls 88 and 94, respectively, of the support 84; but those thicknesses equal or slightly exceed the widths of the lower ends of those slots. Consequently, as the stationary part 102 of the divider has those wings pressed downwardly into those slots, that stationary part will be effectively "grounded" to the support 84; and, because that support is effectively "grounded" to the plural-cell duct by means of the collar 36 and screws 99 and 101, that stationary part also is effectively "grounded" to that plural-cell duct. The numeral 110 denotes a movable part of the divider; and that movable part has an elongated vertically-directed slot 112 therein. Screws 114 extend through the slot 112 and seat within openings in the stationary part 102 of the divider, as indicated particularly by FIG. 1. Those screws are dimensioned so the heads thereof will be spaced far enough from the adjacent surface of the stationary part 102 of the divider to permit the movable part 110 to freely slide up and down relative to that stationary part.

As the wings 106 and 108 of the stationary part of the divider are telescoped downwardly into the slots 90 and 96, respectively, in the walls 88 and 94 of the support 84, the lower end of that stationary part will approach the left-hand side of the partition 22 in the plural-cell duct. Simultaneously, the lower edge of the movable part 110 of that divider will move downwardly into engagement with the upper edge of the partition 22; and the final position of that movable part relative to that stationary part will be determined by the engagement of the lower edge of that movable part with the upper edge of the partition 22. The collar 36 shown in FIGS. 1–5 is short in height; and, in one preferred embodiment of the present invention, that collar has a total height of 1 7/8 inches. As a result, the lower edge of the stationary part 102 of the divider laps the upper edge of the partition 22 in the plural-cell duct. However, with greater-height collars 36, the lower end of the stationary part 102 of the divider will be spaced above the upper edge of the partition 22, and the lower edge of the movable part 110 of that divider will extend downwardly to engage the upper edge of the partition 22. Even when a collar 36 which has an overall height of 6 inches is used, the lower edge of the movable part 110 will be able to engage and rest upon the upper edge of the partition 22. In this way, the stationary part 102 and the movable part 110 of the divider are able to coact with the partition 22 to restore the isolation, of the two cells of the plural-cell duct, which was initially provided by the barrier 62, and which was interrupted by the removal of that barrier.

The numeral 116 denotes a metal plate which preferably has a finished outer surface and which has notches 118 and 120 extending downwardly from the upper edge thereof, as indicated particularly by FIGS. 4 and 5. A grommet 122 of generally-rectangular configuration is disposed within the notch 120; and it has the grooves in three of the edges thereof telescoped over the portions of the plate 116 which denine the sides and bottom of the notch 120. A similar grommet 124 is disposed within the notch 118; and the grooves in three of the edges of that grommet telescope over the portions of the plate 116 which define the sides and bottom of the notch 118. Those grommets are provided with reduced-thickness central portions which can be readily broken away to enable cables and conductors of different diameters to pass through those grommets. Screws 126 extend through openings in the plate 116 to seat in openings in the wall 98 of the support 84, as indicated by FIG. 4. The numeral 128 denotes a duplex outlet receptacle; and screws 130 extend through openings at the outer ends of that receptacle and seat within openings in the wall 100 of the support 84, as shown by FIG. 4. A cover plate 132, which preferably has an attractive outer surface, is provided for the duplex outlet receptacle 128; and a screw 134 extends through an opening in that cover plate to secure that cover plate in position adjacent that duplex outlet receptacle. The grommets 122 and 124 and the duplex outlet receptacle 128 are standard and usual electrical items which are available on the market.

The numeral 136 denotes a metal cover that has a horizontally-directed upper portion, and that has downwardly-extending side portions which make that cover resemble an inverted U in end elevation. Screws 138 extend through countersunk openings in the side portions of that cover and seat in the openings 92 and 97, respectively, in the side walls 88 and 94 of the support 84 to releasably secure that cover to that support. The cover 136 will coact with the plate 116 that supports the grommets 122 and 124, and with the cover plate 132 for the duplex outlet receptacle 128, to completely enclose the top, sides and ends of the support 84. The stationary part 102 of the divider coacts with the support 84 and with the cover 136 to isolate the portions of that support and cover which accommodate the duplex outlet receptacle 128, from the portions of that support and cover which accommodate the grommets 122 and 124. Further, as indicated by FIG. 1, the horizontally-directed portion of the stationary part 102 overlies the duplex outlet receptacle 128; and, in doing so, that horizontally-directed portion will protect a workman, who is installing or working on low voltage cables or conductors, from inadvertently touching an "electrically-live" component. Consequently, as long as the stationary part 102 of the divider is in the position shown by FIG. 1, it performs the dual function of a divider and of a shield.

Whenever a workman wishes to install or to work on the duplex outlet receptacle 128, or on any conductor connected to that duplex outlet receptacle, he will remove the stationary and movable parts 102 and 110 of the divider by raising the wings 106 and 108 of that stationary part upwardly out of the slots 90 and 96, respectively, in the side walls 88 and 94 of the support 84. Once the workman has completed his work on the duplex outlet receptacle, or on the conductors connected thereto, he need only reinsert the lower portions of the wings 106 and 108 within the slots 90 and 96, respectively, in the side walls 88 and 94 of the support 84.

As shown particularly by FIGS. 10 and 11, the sum of the radius of the barrier 62 and of the height of the vertically-directed portion of that barrier is less than the height of the collar 36. Further, as shown by FIG. 10, the horizontally-directed portion of that barrier is generally semi-circular; and hence considerably less metal is needed to make that collar than would be needed to make a diametrical divider which was vertically-directed and which had a height equal to that of the collar 36. With collars 36 which have heights greater than 1 ⅞ inches, the savings in metal which the barriers 62 afford are even greater; and, therefore, it should be apparent that the present invention makes it possible to isolate the cells of a plural-cell duct with less metal than would be required if those cells were isolated by vertically-directed diametrical dividers within the collars 36. Further, because the barrier 62 is assembled with the collar 36 merely by inserting the reduced-height connecting portions 66 and 72 into the slots 44 in the collar 36, it should be apparent that it is easier and less expensive to assemble that barrier with that collar than it would be to use screws to secure a vertically-directed diametrical divider to a collar. Moreover, because the ears 64 and 70 help position and secure the collar 36 of FIGS. 1–5 relative to the plural-cell duct, the use of the barrier 62 reduces the overall cost of locking that collar to that plural-cell duct.

In view of the fact that the barrier 62 is completely removed from the collar 36 of FIGS. 1–5, when the reduced-thickness portions 68 and 74 are broken away, the vertically-directed portion of the stationary part 102 of the divider has to be made longer than it would be if that collar was equipped with a permanently-installed vertically-directed, diametrical divider. However, because only about one of every ten collars is actually used to permit conductors to pass upwardly through the floor 79, only about one of every ten collars 36 will have a divider therein. The overall result is that by using the barrier 62 of the present invention, instead of using a permanently-installed, vertically-directed diametrical divider within the collar 36, substantial savings in metal and cost can be effected.

Referring particularly to FIGS. 6 and 7, the numeral 142 denotes a collar which is identical to the collar 36 of FIGS. 1-5 in all respects other than its length. The collar 142 has a height which is greater than the height of the colar 36; and that collar is used with a floor 143 which is thicker than the floor 79 of FIGS. 1, 3 and 5. The collar 142 is a collar which at one time had a support 84 for electrical fittings connected to it, and which had cables or conductors extending upwardly through it and into that support. As shown by FIGS. 6 and 7, that support has been removed, and so have the cables or conductors. To close the opening, which was formed in the floor 143 prior to the time the support for electrical fitting was connected to the collar 142, a cover 144 is set in register with the upper end of the collar 142. That cover is fixedly held in position by screws 148 which extend downwardly through the openings 56 and 58, respectively, in the ears 48 and 50 on that collar. An L-shaped plate 146 has the horizontally-directed portion thereof secured to the under surface of the cover 144 by spot welds, and the vertically-directed portion of that plate extends downwardly toward the upper edge of the partition 22 within the plural-cell duct. The numeral 147 denotes a plate which has a vertically-directed slot 150 therein; and that plate is held in face-to-face relation with the vertically-directed portion of the plate 146 by screws 149 which extend through that slot and seat in openings in that vertically-directed portion. Those screws are dimensioned so the plate 147 can respond to its own weight to move downwardly into engagement with the upper edge of the partition 22. Where the collar 142 is relatively short in height, the vertically-directed portion of the plate 146 will lap the upper portion of the partition 22, as shown by FIGS. 6 and 7. However, where that collar is taller, the movable plate 147 will move downwardly below the lower edge of the vertically-directed portion of the plate 146 to engage the upper edge of the partition 22. In this way, the plate 146, by itself or with the aid of the movable plate 147, will coact with the partition 22 to restore the isolation between the cells of the plural-cell duct, which was eliminated when the barrier 62 that was originally mounted within the collar 142 was broken away and removed. The plates 146 and 147 thus act as dividers, and thereby make it a simple matter to re-establish the isolation between the cells of a plural-cell duct even after the originally-provided barrier has been removed. A resilient gasket 145 is shown between the cover 144 and a floor covering 151.

Referring particularly to FIGS. 8 and 9, the numeral 152 denotes a collar which resembles the collar 36 of FIGS. 1–5; but that collar is shorter than the collar 36, and it does not have slots in the frusto-conical flange 40 thereof. The collar 152 has abutments 154 and 156 which are similar in form to the abutment 42 and which overlie and engage the upper edge of the frusto-conical flange 28 on the metal plate 24 of the plural-cell duct. Those abutments will coact with the abutment 42 and with the offset 38 to provide four points of engagement between the collar 152 and the upper edge of the frusto-conical flange 28; and those points of engagement will coact with the frusto-conical flange 40 on the lower edge of collar 152 to solidly hold that collar in position relative to the upper wall of the metal plate 24 of the plural-cell duct.

Because it does not have slots in the frusto-conical flange 40 thereof, the collar 152 could not be equipped with the barrier 62 of FIGS. 11 and 12. However, that collar could be equipped with a cup-shaped closure, such as the cup-shaped closure 78 of FIG. 11, if that cup-shaped closure was equipped with a divider. For example, if the cup-shaped closure 78 was equipped with an integrally-formed divider — as is the cup-shaped closure of FIG. 26 — that closure could be used to initially close the upper end of the collar 152. After that cup-shaped closure and its divider were removed from the upper portion of the collar 152, a support for electrical fitting, such as the support 84 of FIGS. 1, 3 and 5, could be secured to that collar. If that support for electrical fitting was subsequently separated from the collar 152, the isolation, which the divider of that support for electrical fitting provided between the cells of the plural-cell duct, could be re-established by a divider 160 which is secured to, and which depends downwardly from, the under surface of a cover 158. That cover is similar to the cover 144 of FIGS. 6 and 7; and screws 162 extend downwardly through that cover and seat in the openings 56 and 58, respectively, in the ears 48 and 50 to secure that cover to the collar 152. The divider 160 is L-shaped in side elevation; and the lower end of the vertically-directed portion thereof will abut one side of the partition 22 in the plural-cell duct, and thus will isolate the two cells of that plural-cell duct from each other. A gasket 163 can be provided between the cover 158 and the floor covering 164, as shown by FIG. 8, to keep water which is spilled or mopped onto that floor covering from entering the collar 152.

The collar 152 is particularly desireable where the plural-cell duct is to be incorporated into a reduced thickness concrete floor; because that collar can be made with a total height of as little as seven-eighths of an inch. That collar could, of course, be made taller, and thus could be used in concrete floors of greater thickness. However, for concrete floors which have thicknesses great enough to permit its use, the collar 36 is preferred; because the barrier 62 and the ears 64 and 70 thereon perform the combined functions of barrier and of locking member. If the collar 152 were to be made so tall that the bottom of an integrally-formed divider on a cup-shaped closure therefor could not about the upper edge of the partition 22, a cup-shaped closure like the cup-shaped closure 78 of FIG. 11 could be equipped with an L-shaped divider such as the divider 160 of FIGS. 8 and 9. Such a closure could effectively coact with the partition 22 to isolate the cells of the plural-cell duct.

Referring particularly to FIGS. 13 and 14, the numeral 166 denotes a metal plate which has two reentrant bends that define partitions 168 and 170. Those partitions extend throughout the length of the metal plate 166, and they are parallel to each other. The numeral 172 denotes a metal plate which has the sides thereof bent downwardly to define a channel; and outwardly-directed flanges 174 are provided at the lower ends of those sides. Those flanges will be suitably secured to the plate 166, as by spot welds, to define a plural-cell duct. The metal plate 172 has an upwardly and inwardly inclined flange 176 at the top thereof which defines an opening that has parallel sides and concave ends. The junction between the plate 172 and the upwardly and inwardly inclined flange 176 has the under surface thereof smoothly rounded, as at 178, to minimize abrasion of the insulation on any cables or conductors which are passed through the opening defined by that upwardly and inwardly inclined flange. The numerals 180 and 182 denote downwardly-bent portions of the metal plate 172; and the downwardly-bent portion 180 is in register with and engages the upper edge of the partition 168, while the downwardly-bent portion 182 is in register with and engages the upper edge of the partition 170. The downwardly-bent portion 180 coacts with the partition 168 to effectively isolate the two cells which are provided at opposite sides of that partition, except where the upwardly and inwardly inclined flange 176 and similar upwardly and inwardly inclined flanges define openings in the metal plate 172. Similarly, the downwardly-bent portion 182 coacts with the partition 170 to effectively isolate the two cells which are provided at opposite sides of that partition, except where the upwardly and inwardly inclined flange 176 and similar upwardly and inwardly inclined flanges define openings in the metal plate 172.

The plural-cell duct of FIGS. 13 and 14 differs from the plural-cell duct of FIGS. 1–5 in that it has three parallel cells whereas the latter plural-cell duct has just two cells. Also, the plural-cell duct of FIGS. 1–5 has circular openings which are defined by the frusto-conical flange 28 and by similar frusto-conical flanges, not shown, whereas the plural-cell duct of FIGS. 13 and 14 has openings with parallel sides and concave ends which are defined by upwardly and inwardly inclined flanges.

The numeral 186 generally denotes a collar which is made from two pieces of sheet metal; and one of those pieces of sheet metal has an offset 188 which overlaps, and is spotwelded to, one end of the other piece of sheet metal. That other piece of sheet metal has an offset 190 which overlaps, and is spotwelded to, the opposite end of the first piece of sheet metal. The offsets 188 and 190 extend downwardly from the upper edge of the collar 186 to points which are spaced short distances from the lower edge of that collar. The collar 186 has abutments 192 and 194 which resemble the abutment 42 on the collar 36 of FIGS. 1–5. As shown particularly by FIG. 14, the offsets 188 and 190 are located at the approximate centers of the ends of the collar 186, and the abutments 192 and 194 are located at the approximate centers of the sides of that collar. The offsets 188 and 190 and the abutments 192 and 194 will rest upon the upper edge of the upwardly and inwardly inclined flange 176 whenever the lower end of that collar is fully seated within the opening defined by that flange. The lower edge of the collar 186 has a downwardly and outwardly inclined flange 196 which abuts and underlies the upwardly and inwardly inclined flange 176 on the metal plate 172. The abutments 192 and 194 and the offsets 188 and 190 will hold the collar 186 against movement downwardly relative to the metal plate 172, while the downwardly and outwardly inclined flange 196 will prevent upward movement of that collar relative to that plate. As a result, the collar 186 will be solidly secured to the plate 172.

The numeral 198 denotes an ear which is punched inwardly of one wall of the collar 186, and that ear has a vertically-directed opening 200 therein. One edge of that opening is immediately adjacent the inner surface of the collar 186, so the thread of a screw which is passed downwardly through that opwning will bite into the inner face of the wall of that collar. The ear 198 is generally semi-circular in plan view, and it is punched out of a generally semi-circular opening 202 in the wall of the collar 186. The numeral 204 denotes a similar ear which has a similar opening 206 therein, and which is punched out of a semi-circular opening 208 in the wall of the collar 186. The numeral 210 denotes an ear which is in register with the ear 198; and that ear has a vertically-directed opening 212 therein. The numeral 214 denotes an ear which is in register with the ear 204, and it has a vertically-directed opening 216 therein. As indicated particularly by FIG. 14, the ears 198 and 210 are disposed a short distance to the right of the partition 168, and the ears 204 and 214 are disposed a short distance to the left of the partition 170.

The numeral 218 denotes a short, vertically-directed slot which is formed in the downwardly and outwardly directed flange 196 at the lower edge of the collar 186; and that slot is similar to either of the slots 44 of the collar 36 of FIGS. 1–5. A similar slot, not shown, is provided in the opposite side of the downwardly- and outwardly-directed flange 196 on the collar 186. Those slots accommodate connecting portions 223 which initially connect a barrier 220, shown by dotted lines in FIG. 13, to ears 222 that are disposed outwardly of the upwardly and inwardly inclined flange 176 on the metal plate 172. The connecting portions 223 can be essentially identical to the connecting portions 66 and 72 on the barrier 62 of FIG. 12; and the ears 222 can be essentially identical to the ears 64 and 70 on the barrier 62. The barrier 220 will be L-shaped, and thus will resemble the barrier 62 of FIG. 12 in end view; but the barrier 220 will have a configuration which is complementary to the space between the partition 170 and the right-hand end of the collar 186. A tab 224 extends upwardly from the free edge of the barrier 220; and that tab can be gripped to separate that barrier from the connecting portions 223. Reduced-thickness portions, not shown, which are comparable to the reduced-thickness portions 68 and 74 on the barrier 62 of FIG. 12, will be provided between the barrier 220 and the connecting portions 223.

The numeral 226 denotes a concrete floor in which the plural-cell duct, the collar 186, and the ears 222 are solidly embedded. The numeral 228 denotes broken-away portions of the floor 226 which are above the level of, and generally in register with, the collar 186. Initially, that collar had a closure therefor which was cup-shaped and which was pressed tightly down into the upper portion of that collar. The side wall of that cup-shaped closure blocked the openings 202 and 208, and also blocked the corresponding openings from which the ears 210 and 214 were punched. As a result, that cup-shaped closure kept virtually all of the concrete of the floor 226 from leaking into the collar 186 through the upper portion of that collar. The engagement between the downwardly- and outwardly-directed flange 196 at the lower edge of the collar 186 and the upwardly and inwardly directed flange 176 is sufficiently intimate to keep concrete from passing therebetween. A floor covering 229, which can be in the form of wide sheets or individual tiles, overlies the concrete floor 226; and that floor covering has an opening therein in register with the collar 186.

The numeral 230 generally denotes a support for electrical fitting which as an opening 234 in the bottom 232 thereof; and that support is shown as an outlet box. That opening will be slightly larger than, but will closely resemble, the opening defined by the upper end of the collar 186. Ears 245, one of which is shown in FIG. 13, extend inwardly of the opening 234; and those ears have openings therein which are in register with the openings 206 and 216, respectively, in the ears 204 and 214 on the collar 186. A gasket 233 is disposed between the bottom 232 and the floor covering 229 for the concrete floor 226.

The numeral 236 denotes one of the side walls of the support 230, and that side wall has a slot 238 which extends downwardly from the upper edge thereof. The upper end of that slot is slightly wider than the lower end of that slot, as indicated by FIG. 13. A threaded opening 240 is provided in the side wall 236, and that opening is disposed to the left of the slot 238, as shown by FIG. 13. The support 230 has the opposite side wall thereof, not shown, formed as a mirror image of the side wall 236; and the threaded opening in that opposite side wall is in register with the threaded opening 240, and the slot in that opposile side wall is in register with the slot 238. The numeral 242 denotes one of the end walls of the support 230, and that end wall has a wide notch, not shown, which extends downwardly from the upper edge thereof to make that end wall substantially U-shaped. The end wall 242 can be similar, or even essentially identical, to the end wall 98 of the support 84 of FIGS. 1–5. The numeral 244 denotes the opposite end wall of the support 230; and that end wall has a wide notch, not shown, in the upper edge thereof which extends downwardly to make that end wall substantially U-shaped. The end wall 244 can be similar, or even essentially identical to, the end wall 100 of the support 84 of FIGS. 1–5.

A self-tapping metal screw 246 extends downwardly through an opening in the ear 245 on the support 230, and then through the opening 206 of the ear 204 on the collar 186. The thread of that screw will bite into the inner surface of the collar 186 as well as into the metal of the ears 245 and 204; and the head of that screw will firmly abut the upper surface of the ear 245. As a result, that screw will effectively "ground" the support 230 to the collar 186; and that collar is effectively "grounded" to the plural-cell duct by the flanges 176 and 196, respectively, on the metal plate 172 and on that collar. In this way, the support 230 will be "grounded" to that plural-cell duct. A similar self-tapping metal screw, not shown, will extend downwardly through an opening in an ear, not shown, which is comparable to the ear 245 and then through the opening 216 in the ear 214 on the collar 186. That screw will effectively "ground" the support 230 to the collar 186; and, because that collar is effectively "grounded" to the plural-cell duct, that screw will effectively "ground" the support 230 to that plural-cell duct. Because both the screw 246 and its conterpart effectively "ground" the support 230 to the plural-cell duct, those screws provide a double safety factor in the "grounding" of that support.

The numeral 248 denotes the stationary part of a divider which has wings, not shown, that can be identical to the wings 106 and 108 of the stationary part 102 of the divider of FIGS. 1–5. The lower portions of the outer edges of those wings will be lodged within the slot 238 in the side wall 236 and within the corresponding slot, not shown, in the opposite side wall of the support 230. The stationary part 248 has a horizontally-extending upper portion which overlies the area between the end wall 244 and the slot 238 and its counterpart slot. The numeral 252 denotes a vertically-directed movable part of the divider which has a vertically-directed slot, not shown, therein. That movable part can be similar to the movable part 110 of FIGS. 1–5; and the vertically-directed slot in the movable part 252 can be identical to the vertically-directed slot in the movable part 110. Screws 254 extend through the vertically-directed slot in the movable part 252 and seat in threaded openings in the stationary part 248 of the divider. Those screws hold the movable part 252 in assembled relation with the stationary part 248 of the divider, but they permit that movable part to move upwardly and downwardly relative to that stationary part.

The numeral 256 denotes a plate which has a finished outer surface and which has grommets 258 supported within notches that extend downwardly from the upper edge thereof. Screws 260 extend through countersunk openings in that plate and seat in tapped openings within the end wall 242 of the support 230. The plate 256 and the grommets 258 can be similar, or even essentially identical, to the plate 116 and the grommets 122 and 124 of FIGS. 1–5. If desired, the plate 256 can be equipped with three grommets, rather than with just the two grommets of FIGS. 1–5. The numeral 262 denotes a duplex outlet receptacle which has the strap thereof secured to the end wall 244 of the support 230 by screws 264. A cover plate 266 for that duplex outlet receptacle is secured to that duplex outlet receptacle by a screw, not shown. The numeral 268 denotes a metal cover which is similar to the cover 136 of FIGS. 1–5. A screw 270 extends through a countersunk opening in one wall of that cover and is seated within the opening 240 in the side wall 236 of the support 232. A similar screw, not shown, extends through a similar countersunk opening in the opposite side wall of that cover and seats in a similar tapped opening in the opposite side wall of the support 230.

When the plural-cell duct of FIGS. 13 and 14 is set in position within the form for the concrete floor 226, each of the collars 186 will have a barrier 220 therein and each of those barriers will effectively isolate the right-hand cell from the middle and left-hand cells. Also, each of those collars will have a cup-like closure, not shown, pressed into the upper end thereof to keep concrete from entering the upper end of that collar when the floor 226 is cast. The side wall of that cup-like closure will effectively close the openings 202 and 208 and their counterparts in the opposite side wall of the collar 186. Consequently, virtually no concrete will be able to enter the collar 186.

After the building, of which the concrete floor 226 is a part, has been erected, and when the various cables or conductors are to be installed, the cup-like closure, not shown, of the selected collars 186 will be uncovered by breaking away the thin layer of concrete thereabove. Those closures can then be removed by forcing a cold chisel, the blade of a screwdriver, or the like downwardly through the central portions thereof, and then applying prying forces to that cold chisel, screwdriver or the like. Once a cup-like closure has been removed, a pair of pliers or some other instrument can be inserted into the collar 186 to apply firm pulls to the tab 224 on the barrier 220. When the reduced-thickness portions between that barrier and the connecting portions 223 have been broken away, that barrier will be removed; and then the support 230 will be solidly secured to the collar 186 by the screw 246 and its counterpart.

If conductors of the power-supplying system are to be "fished," the stationary part 248 of the divider will be removed from its position within the support 230 and the collar 186. Thereafter, those power-supplying conductors can be "fished" through the right-hand cell of the plural-cell duct, and can be pulled upwardly through the right-hand end of the collar 186 and through the right-hand end of the support 230. After the bared ends of those conductors have been suitably held by the binding screws of the duplex outlet receptacle 262, the stationary part 248 of the divider can be set in position so the horizontally-directed portion thereof will overlie and shield the "electrically-live" portions of that duplex outlet receptacle. As the ears of the stationary part 248 of the divider are pressed downwardly into the slot 238 and into its counterpart, the movable part 252 of that divider will engage the upper edge of the partition 170 and will assume the position shown by FIG. 13.

If, on the other hand, cables or conductors of a low-voltage system are to be "fished," the stationary part 248 of the divider will be left in position within the support 230 and the collar 186. That stationary part and the movalbe part 252 will coact to effectively isolate the middle and left-hand cells of the plural-cell duct from the right-hand cell. Also, that stationary part and that movable part will coact to keep a workman's hand from accidentally coming into contact with an "electrically-live" portion of the duplex outlet receptacle 262.

Referring particularly to FIGS. 15–17, the numeral 272 denotes the upper wall of a plural-cell metal duct; and the numeral 274 denotes a collar which extends upwardly from the upper surface of that wall to define an opening. Preferably, that collar is formed by a "drawing" operation, so it can be a homogeneous part of the wall 272 and so there will be no line of cleavage between that collar and that wall. Because of the cost and difficulty of making deep-drawn collars, the wall 272 and the collar 274 will usually be restricted to installations where the collar is less than one inch high. The numeral 276 denotes one of the side walls of th plural-cell metal duct; and a partition 278, which is located between that side wall and another side wall, not shown, subdivides that plural-cell duct into a plurality of elongated parallel cells.

The numeral 280 denotes concrete which is formed around the collar 274 and which overlies the upper wall 272 of the plural-cell duct; and that concrete will usually be part of the floor of a building. The numeral 282 denotes broken portions of the concrete immediately adjacent the upper edge of the collar 274; and the numeral 284 denotes a floor covering for the concrete 280. That floor covering can be in the form of a continuous sheet or in the form of a number of individual tiles; and it has an opening therein which is in register with the collar 274. A resilient gasket 286 is provided adjacent the opening in the floor covering 284, as shown particularly by FIGS. 15 and 16.

At the time the plural-cell duct is shipped to a building site, each of the collars 274 thereof will have a closure therein. Those closures will have dividers secured to, or made integral with, them; and those dividers will coact with the partition 278 to effectively isolate the adjacent cells of the plural-cell duct from each other. Those closures could resemble the cup-shaped closure 78 of FIG. 11, but would have a divider such as the divider 160 of FIGS. 8 and 9 secured to the web thereof; or those closures could be like the closure of FIG. 26. In any event, those closures would be set within the collars 274 to keep concrete from entering those collars.

The numeral 288 generally denotes a divider which is approximately rectangular in elevation; and that divider can be installed in any collar 274 from which the closure has been removed. That divider has a vertically-directed groove-defining bent portion 290 adjacent one end thereof, and it has a similar vertically-directed groove-defining bent portion 292 adjacent the opposite end thereof. A short punched-out length 294 of the bent portion 290 coacts with the rest of that bent portion to define a vertically-directed opening 298; and a short punched-out length 296 of the bent portion 292 coacts with the rest of that bent portion to define a vertically-directed opening 300. The openings 298 and 300 are large enough to accommodate the lower ends of self-tapping metal screws 319. A limited-height wing 302 projects outwardly beyond the bent portion 290, and a similar wing 304 projects outwardly beyond the bent portion 292. An ear 306 is bent outwardly and downwardly from one side of the divider 288 so the downwardly-bent portion of that ear is laterally displaced from a plane which is defined by the wings 302 and 304. The lateral displacement of the ear 306 from that plane is approximately equal to the width of the partition 278 in the plural-cell duct.

The distance between the outermost edges of the bent portions 290 and 292 is slightly less than the inner diameter of the collar 274, as indicated by FIG. 15. However, the distance between the outermost edges of the wings 302 and 304 is considerably greater than that inner diameter; and hence those wings can underlie, and extend outwardly of, the portions of the upper wall 272 of the plural-cell duct which surround the opening defined by the collar 274. When the wings 302 and 304 underlie the upper wall 272 of the plural-cell duct, they will prevent any upward separating movement of the divider 288 from that plural-cell duct. Moreover, when the divider 288 is in the position shown by FIGS. 15 and 16, the wings 302 and 304 are disposed at one face of the partition 278 while the downwardly-directed portion of the ear 306 is disposed at the opposite face of that partition; and hence those wings will coact with that ear to hold that divider in alignment with that partition, and thereby enable that divider to act as an extension of that partition. Furthermore, the outermost edges of the bent portions 290 and 292 will confront the inner surface of the collar 274, and will thereby limit the extent to which the divider 288 can be shifted longitudinally of the partition 278. The overall result is that when the divider 288 is in the position shown by FIGS. 15 and 16, that divider will act as an extension of the partition 278 and will coact with that partition to effectively isolate the two elongated cells of the plural-cell duct.

To install the divider 288 within the collar 274, that divider will be tilted so a line which extends between the wings 302 and 304 will incline downwardly from upper right to lower left in FIG. 15; and then that divider will be moved downwardly through the collar 274 and into the left-hand cell of the plural-cell duct, as that plural-cell duct is viewed in FIG. 16. After all portions of that divider have been moved downwardly into that cell and below the level of the collar 274, that divider will be rotated 90° about the line which extends between the wings 302 and 304 and, thereupon, the plane of that divider will be horizontally-disposed. Also, the convex surfaces of the bent portions 290 and 292 will be facing downwardly while the ear 306 will be extending upwardly. The bottom edge of the divider 288 will then be moved horizontally into engagement with the upper edge of the partition 278, and that divider will be shifted axially of that partition until the outermost edges of the bent portions 290 and 292 thereof are both located inwardly of the opening defined by the collar 274. At such time, the divider 288 can be rotated, about the line which extends through the wings 302 and 304, until it assumes the position shown by FIGS. 15 and 16. As that divider is so rotated, the upper edges of the wings 302 and 304 will engage the under face of the wall 272 of the plural-cell duct; and that engagement will prevent removal of that divider upwardly through the opening defined by the collar 274, and also will cause the ear 306 to successively move over, and then downwardly below the level of, the upper edge of the partition 278. When the divider 288 reaches the position shown by FIGS. 15 and 16, the ear 306 will be at one side of the partition 278 while the wings 302 and 304 will be at the opposite side of that partition, and the upper edges of those wings will be immediately adjacent the under face of the wall 272 of the plural-cell duct. Consequently, that divider will be fixedly held against accidental separation from the plural-cell duct or the collar 274.

If it ever becomes desirable to remove the divider 288 from the collar 274 — as when the cables and conductors within that collar are to be removed — that divider can be rotated in the counterclockwise direction in FIG. 16, about the upper edge of the partition 278, until that divider reaches a horizontal position. At such time, the ear 306 will have been rotated upwardly and out of engagement with that partition, and the faces of the wings 302 and 304 will be spaced away from that partition. Although those wings will still be underlying the portions of the wall 272 of the plural-cell duct which surround the opening defined by the collar 274, and thus will prevent upwardly-directed separating movement of the divider 288 from the collar 274, that divider can be shifted longitudinally of the partition 278 until one of those wings moves into register with that opening. Thereupon, the divider 288 can be tilted upwardly and then withdrawn through the collar 274.

The numeral 308 denotes a support for an electrical fitting; and that support has upwardly-directed side walls 310 and upwardly-directed U-shaped end walls 312. The side walls 310 can be similar to the side walls 88 and 94 of the support 84 of FIGS. 1 and 3–5; and the upeardly-directed U-shaped end walls 312 can be similar to the end walls 98 and 100 of that support. The support 308 has a generally-circular opening 314 in the bottom thereof; and that opening is in register with the opening in the gasket 286, and also with the opening defined by the collar 274, as shown particularly by FIG. 16. Ears 315 are provided at opposite sides of the opening 314; and those ears have openings 316 therein to accommodate the screws 319. The openings 316 are in register with the openings 298 and 300 defined by the barrier 288, as shown by FIG. 15. The numeral 318 denotes openings in the side walls 310 of the support 308, and one of those openings is shown in FIG. 16.

The shanks of the self-tapping metal screws 319 extend into the openings 298 and 300 defined by the divider 288; and the threads of those screws will bite into the adjacent surfaces of the portions 290 and 294, and also into the adjacent surfaces of the bent portion 292 and 296, to fixedly secure the support 308 to the divider 288. As those screws are tightened, the upper edges of the wings 302 and 304 will be raised up into intimate engagement with the under face of the wall 272 of the plural-cell duct and hence the divider 288 and the support 308 will be fixedly and solidly secured to the plural-cell duct and to the floor covering 284. The gasket 286 will engage the bottom of the support 308 as well as the floor covering 284, and thus will keep any water, which is spilled or mopped onto the floor, from reaching and entering the collar 274.

The numeral 320 denotes a plate which has one or more grommets 322 held thereby; and that plate can be identical to the grommet-supporting plate 116 of FIGS. 1, 4 and 5. Screws 324 extend through openings in that plate and seat in openings in the left-hand end wall 312 of FIG. 16. The numeral 326 denotes a plate which receives a duplex outlet receptacle 328; and that plate can be identical to the receptacle-receiving plate 132 in FIGS. 1, 4 and 5. Screws 327 extend through openings in the plate 326 and seat in openings in the right-hand end wall 312 in FIG. 16.

The numeral 330 generally denotes a divider which has a horizontally-directed portion 332, and which has an offset 334 in the vertically-directed portion thereof. That offset disposes the lowermost portion 336 of the divider 330 at the left-hand side of the divider 288 in FIG. 16. Wings 339 on the divider 330 have the lower portions of the outer edges thereof lodged within tapered slots 341 in the upstanding side walls 310 of the support 308 for electrical fitting. Those portions of those outer edges will be wedged downwardly into the slots 341 to fixedly hold the divider 330 against tilting or accidental separation from the support 308. As indicated particularly by FIG. 16, the divider 330 coacts with the partition 278 and the divider 288 to isolate the right-hand cell of the plural-cell metal duct and the right-hand portions of the collar 274 and of the support 308 from the left-hand cell in that plural-cell duct and from the left-hand portions of the collar 274 and of the support 308.

The numeral 340 denotes an inverted U-shaped metal cover which has the sides thereof telescoped downwardly over the outer edges of the plates 320 and 326, and over the outer faces of the side walls 310. Screws 342 extend through countersunk openings in the side walls of the inverted U-shaped cover 340, and are seated in the openings 318 in the side walls 310. That inverted U-shaped cover can be identical to the inverted U-shaped cover 136 in FIGS. 1 and 3–5.

Referring particularly to FIGS. 18–21, the numeral 344 generally denotes a barrier which can be used in the collar 36 of FIGS. 1–5, 10 and 11. That barrier has a generally-plane, horizontally-directed portion which is pentagonal in plan view, and which has the sides thereof dimensioned to fit within the space defined by the collar 36. A flange 348 extends downwardly from one edge of that barrier, as shown particularly by FIG. 21; and an ear 346 is bent downwardly adjacent that flange. The outer face of the ear 346 and the inner face of the flange 348 are spaced apart a distance which is comparable to the thickness of the partition 22 of the plural-cell metal duct. As a result, that ear and that flange can abut opposite faces of the partition 22, as shown particularly by FIG. 19, and thus can hold that barrier fixedly in position on that partition. A tab 350 extends upwardly from the opposite edge of the barrier 344; and that tab can be used to install or to remove that barrier from its position within the collar 36.

As indicated particularly by FIG. 19, the frusto-conical flange 40 at the lower edge of the collar 36 has a slot 46 therein; and that slot accommodates one of the reduced-height connecting portions 66 and 72 of the barrier 62 which are shown particularly by FIG. 12. As a result, that barrier was able to coact with the partition 22 of the plural-cell metal duct to provide initial isolation of the two elongated cells of that plural-cell metal duct. However, after that barrier was broken away from those reduced-height connecting portions, full and complete access to the central portion of the collar 36 was had; and conductors 361 were "fished" through the right-hand elongated cell shown in FIG. 19.

The bared ends of those conductors were connected to the terminals of a single outlet receptacle 360 which has two prong-receiving slots plus a slot for a grounding pin, as shown by FIG. 18. A strap 358, which is secured to and supports the receptacle 360, is secured to the under surface of a support for electrical fitting which is generally denoted by the numeral 352. Screws 362 extend upwardly through openings in the ends of that strap and seat in openings in that support. As shown particularly by FIG. 18, the support 352 has a circular periphery but has a generally-oblong opening 356 therein. As indicated by FIGS. 19 and 20, the support 352 has a shallow annular recess 354; and, as indicated by FIG. 20, it has openings therein which accommodate self-tapping metal screws 99. Those screws extend downwardly through openings in the ears 48 and 50 at the inner surface of the collar 36, as shown particularly by FIG. 20; and, when those screws are tightened, they will press the under surface of the periphery of the support 352 solidly against the floor covering 351 which overlies the concrete floor 79. The shallow annular recess 354 in the upper surface of the support 325 accommodates a cover plate 364; and that cover plate has a relatively-large threaded opening 366 therein which can accommodate a standard and usual threaded plug. That plug will overlie and protect the single outlet receptacle 360 whenever that outlet receptacle is not being used. Screws 368 extend downwardly through openings in the cover plate 364 to seat in openings in the support 352.

The barrier 62, which is shown in FIG. 12, will be installed within the collar 36 of FIGS. 19 and 20 at the time the plural-cell duct is shipped from the factory; and that barrier will effectively coact with the partition 22 to isolate the elongated cells of that elongated plural-cell duct. Until such time as the collar 36 of FIGS. 19 and 20 is to have a single outlet receptacle mounted within it, the barrier 62 will remain undisturbed; and thus will coact with the partition 22 to isolate the two elongated cells of the elongated plural-cell duct from each other. However, whenever it is desirable to install a single outlet receptacle within that collar, an opening will cut in the floor covering 351, and the concrete above that collar will be broken away to define the broken-away portions 80. Thereafter, the cup-shaped closure, not shown, in the collar 36 will be removed, and then the barrier 62 will be broken away and removed from that collar.

After the barrier 62 has been broken away and removed from the collar 36, but before the conductors 361 are "fished," the barrier 344 will be set in position to overlie the exposed portion of the left-hand elongated cell of the plural-cell duct. That barrier will then coact with the partition 22 to maintain the isolation of the elongated cells of that plural-cell duct. The conductors 361 will then be "fished" through the right-hand elongated cell, and will have the bared ends thereof moved outwardly of the collar 36 and secured to the terminals of the single outlet receptacle 360. Thereafter, the screws 99 will be passed downwardly through the openings in the ears 48 and 50 at the inner surface of the collar 36, and then those screws will be tightened to solidly secure the support 352 against the floor covering 351. Finally, the cover plate 356 will be set within the shallow annular recess 354, and will then be held in that recess by the screws 368.

Referring particularly to FIGS. 22–25, the numeral 370 denotes a strap which has the same dimensions as the strap 358 in FIGS. 18–20; and that strap can be secured to the under surface of the support 352 for electrical fitting by screws 376. As shown particularly by FIG. 25, the strap 370 has a slot 372 therein, and that slot accommodates a generally U-shaped grommet 374. The numeral 378 denotes a cover plate which has a circular opening 380 therein, and that opening accommodates a grommet 382. That grommet can accommodate a cable 386 such as a telephone cable or the cable of an intercommunication system. Screws 384 are usable to secure the cover plate 378 within the shallow annular recess 354 in the upper surface of the support 352 for electrical fitting.

When the elongated plural-cell duct of FIG. 23 is shipped to a building site, it will have the collar 36, together with other similar collars, not shown, secured to it; and each of those collars will have a barrier 62 therein and will have the upper end thereof blocked by a closure, such as the closure 78 of FIG. 11. The barriers 62 will coact with the partition 22 to maintain effective isolation of the elongated cells of the elongated plural-cell duct from each other.

Whenever it is desirable to pass the cable 386 through the collar 36 shown in FIGS. 23 and 24, an opening will be cut in the floor covering 351, the concrete which overlies the upper end of that collar will be broken away, the U-shaped closure will be removed, and then the cable 386 will be "fished" through the left-hand elongated cell of the elongated plural-cell duct. The barrier 62 will not be disturbed; and hence it will continue to coact with the partition 22 to effectively isolate the elongated cells of the elongated plural-cell duct from each other. This means that the cable 386 can be "fished" without any risk of it getting into the elongated cell in which power-supplying conductors have been, or will be, "fished" for connection to outlet receptacles adjacent other collars 36, not shown.

Once the cable 386 has been "fished" through the collar 36, the free end of that cable will be passed upwardly through the opening 356 in the support 352; and that free end will be moved through that opening until a suitable length of that cable projects beyond that opening. Thereupon, the portion of the cable 386 adjacent the grommet 374 will be pressed into position within the open end of that grommet; and, thereafter, that grommet will help resist shifting of that cable relative to the support 352. The free end of the cable 386 will then be telescoped through the grommet 382 which is carried by the cover plate 378; and then that cover plate will have the periphery thereof seated within the shallow, annular recess 354 in the upper surface of the support 352. At such time, the screws 384 can be used to hold that cover plate in position within that shallow circular recess.

Ordinarily a gasket will not be required between the support 352 and the floor covering 351. However, if such a gasket were ever needed, it could be readily supplied. All that would have to be done would be to remove the screws 368 in FIGS. 18 and 19, or the screws 384 in FIGS. 22 and 23, to remove the screws 99 in FIGS. 20 and 24, to insert the gasket, and to replace and tighten the screws 99 and 368 or 384.

The cup-shaped closure of FIG. 26 is denoted by the numeral 390; and it has a generally-cylindrical portion which will intimately engage the inner surface of the collar 274 on the plural-cell duct. Preferably, a press fit will be provided between the generally-cylindrical portion of that closure and the inner surface of that collar; because such a fit will keep virtually all concrete from entering the upper end of that collar. The cup-shaped closure 390 also has a generally-plane web which will effectively seal the upper end of the collar 274; and that web has a divider 392 extending downwardly from the lower face thereof. That divider preferably is formed by a "drawing" operation; and that divider is a chord of the circle defined by the collar 274. Moreover, the lower surface of the divider 392 is convex, as indicated by FIG. 26.

The U-shaped closure 390 will perform the dual function of keeping the concrete 280 from entering the collar 274 when that concrete is poured, and also of serving as an upward extension of the partition 278 to coact with that partition to effectively isolate the two elongated cells of the plural-cell duct. Consequently, when electrical conductors are passed through the right-hand elongated cell of that plural-cell duct, those conductors will be kept from entering the elongated left-hand cell of that plural-cell duct. However, whenever a support 308 for an electrical fitting is to be secured to the collar 274 shown in FIG. 26, the thin layer of concrete, which overlies the upper end of the collar 274 and also overlies the generally-cylindrical portion of the closure 390, will be broken away and that cup-shaped closure will be removed. At such time, a divider 288 can be disposed within the collar 274, in the manner described hereinbefore; and that divider can then perform the function which the divider 392 performed while the cup-shaped closure 390 was in position within the collar 274. The divider 288 will, of course, perform the additional function of acting as a securing means for the screws 319, and thus for the support 308.

The cup-shaped closure 390 of FIG. 26 is a very useful, but very inexpensive, component of the overall plural-cell duct. That closure can be punched and drawn from sheet metal, and thus can be made quite inexpensively. Also, it does not have to have any parts assembled with it before it is set within a collar on a plural-cell duct; and hence it does not require additional parts or assembling operations. Further, that closure is installed simply by pressing it down into position within a collar 274; and, once it has been set in position, that closure will perform the dual functions of excluding all foreign material and of serving as an extension of the partition 278 to isolate the elongaged cells within the plural-cell duct.

The closure 390 is shown in FIG. 26 as it appears when installed within a collar 274. That collar also could be installed within the collar 152 of FIGS. 8 and 9, or within any other short-height collar. The primary requirement of any collar in which the closure 390 is used is that it be short enough to enable the divider 392 on that closure to closely approach the upper edge of the partition within the plural-cell duct.

Referring particularly to FIGS. 27-32, the numeral 394 generally denotes a collar which is similar to the collar 186 in FIGS. 13 and 14. The collar 394 has an offset 396 at one end thereof which is comparable to the offset 188 in FIGS. 13 and 14, and it has an offset 398 at the opposite end thereof which is comparable to the offset 190 in FIGS. 13 and 14; and it has an outwardly and downwardly inclined flange 399 at the lower edge thereof which is comparable to the outwardly and downwardly inclined flange 196 on the collar 186. Further, the collar 394 will have abutments, not shown, which will be comparable to the offsets 192 and 194, shown in FIGS. 13 and 14. In addition, the collar 394 has ears 404, 408 410 and 414 at the inner surface thereof, and those ears are comparable to the ears 198, 210, 204 and 214, respectively, of the collar 186 in FIGS. 13 and 14. An opening 406 is formed in the wall of the collar 394 as the ear 404 is formed, and an opening 412 is formed in that wall as the ear 410 is formed; and those openings are comparable to the openings 202 and 208 in FIG. 13. Openings, not shown, are provided in the ears 404, 408, 410 and 414; and those openings are comparable to the openings 200, 212, 206 and 216, respectively, in FIG. 14. The primary difference between the collar 394 in FIGS. 27-32 and the collar 186 in FIGS. 13 and 14 is the heights of those collars — the collar 394 being shown as being shorter than the collar 186.

The collar 394 is secured to an elongated plural-cell duct which can be identical to the elongated plural-cell duct shown in FIGS. 13 and 14. The outwardly and downwardly inclined flange 399 on the collar 394 abuts, and is disposed inwardly of, the upwardly and inwardly inclined flange 176. That collar and that plural-cell duct will be locked together by connecting portions, not shown, which are comparable to the connecting portions 223 in FIG. 14. When the collar 394 and the plural-cell duct are shipped to a building site, that collar will be equipped with a barrier, not shown, such as the barrier 220 of FIG. 13.

The numeral 400 in FIGS. 28-32 denotes concrete which surrounds the collar 394 and overlies the plural-cell duct; and that concrete will initially overlie that collar and a cup-shaped closure therefor. Whenever it is desirable to mount electrical fittings adjacent the collar 394, an opening will be cut in the floor covering 435; and then the section of the concrete floor overlying the collar 394 will be broken away to form the broken-away portions 402. After the cup-shaped closure has been removed, the barrier which is comparable to the barrier 220 in FIG. 13 will be broken away and removed.

The numeral 416 generally denotes a bracket which is shown in plan view in FIG. 31 and which is shown by a vertical section in FIG. 28. As shown by FIG. 31, that bracket has spaced-apart horizontally-directed arms 418 which extend to the left from the upper end of a vertically-directed portion; and the portions of those arms which are immediately adjacent that vertically-directed portion are widened for stiffening purposes by inclined sections. Openings 420 are provided in the arms 418 adjacent that vertically-directed portion; and further openings, not shown, are provided in those arms adjacent the free ends of those arms. The bracket 416 has a shelf 422 which extends to the left from the lower edge of the vertically-directed portion of the bracket 416; and that shelf has a pair of wide slots 424 extending inwardly from the opposite sides thereof, and has a pair of narrow slots 426 extending inwardly from those sides. An L-shaped extension 428 has the vertically-directed portion thereof secured to the vertically-directed portion of the bracket 416 by a screw 430; and it has the horizontally-directed portion thereof overlying the upper edge of the partition 170 in the plural-cell duct.

The arms 418 of the bracket 416 overlie the upper edges of the sides of the collar 394, as indicated particularly by FIGS. 28, 30 and 31; and screws 442 extend downwardly through the openings, not shown, adjacent the free ends of those arms and pass through the openings in the ears 404 and 408 to fixedly secure that bracket to that collar. A slot 429 in the vertical portion of the L-shaped extension 428 accommodates the shank of the screw 430, and that slot and screw will permit the position of that L-shaped extension to be adjusted relative to the position of the bracket 416. In this way, the bracket 416 and its L-shaped extension 428 can be used with collars of different heights. After the arms 418 of the bracket 416 have been fixedly secured to the collar 394, the screw 430 will be loosened; and the horizontally-directed portion of the L-shaped extension 428 will be moved downwardly into engagement with, or in close proximity to, the partition 170, and then the screw 430 will be re-tightened. Grommets 432, which have slits in the outer ends thereof, are disposed within the wide slots 424 in the shelf 422 of the bracket 416. One of those grommets is shown in FIG. 31, the other of those grommets is shown in FIGS. 27 and 28, and both of those grommets are shown in FIG. 29. That other grommet was omitted from FIG. 31 to make it possible to show the configuration of the slot therefor by solid lines. Grommets 434, which have slits in the outer ends thereof, are disposed within the narrow slots 426 in the shelf 422 of the bracket 416. One of those grommets is shown in FIG. 31, while the other of those grommets is shown in FIGS. 28 and 29. That other grommet 434 was omitted from FIG. 31 to make it possible to show the configuration of the slot 426 therefor by solid lines.

The numeral 436 denotes a support for electrical fitting; and that support is generally oblong in plan, as indicated by FIG. 27. A shallow generally-oblong recess 438 is formed in the upper surface of that support, and that recess is disposed between the outer periphery of that support and a generally-oblong opening 440 which extends through that support, as shown by FIGS. 27 and 28. Screws 444 extend downwardly through openings at the midpoints of the sides of the support 436 and pass through the openings 420 in the arms 418 of the bracket 416; and those screws fixedly secure the support 436 to the bracket 416, and hold the periphery of that support in intimate engagement with the floor covering 435. Ordinarily a gasket is not required between the support 436 and the floor covering 435; but, if a gasket should be desired, it could easily be disposed between the lower surface of that support and the upper surface of that floor covering before the screws 444 are used to secure that support in position.

The numeral 446 denotes a strap which supports a duplex outlet receptacle 448; and the outer ends of that strap overlie the upper edge of the collar 394, as indicated by FIGS. 31 and 32. Screws 450 extend downwardly through openings in the outer ends of the strap 446 to seat in the openings in the ears 410 and 414, as indicated particularly by FIGS. 31 and 32. As a result, those screws can fixedly secure that duplex outlet receptacle to the collar 394.

The numeral 452 denotes a cover plate which is generally-oblong in plan, and that cover plate is dimensioned to fit down into the generally-oblong shallow recess 438 in the upper surface of the support 436. That cover plate has openings 454 therein adjacent the left-hand end thereof, and it has threaded openings 456 therein adjacent the right-hand end thereof, all as shown by FIGS. 27 and 28. The openings 454 accommodate grommets 458; and one of those grommets is shown in FIG. 27, while the other of those grommets is shown in FIG. 28. That other grommet was not shown in FIG. 27 to make it possible to show the configuration of the slot 454 therefor by solid lines.

When it is desirable to mount electrical fittings adjacent the collar 394, an opening will be formed in the floor covering 435, and the concrete which overlies that collar will be broken away, as described hereinbefore. Also, the barrier, which is similar to the barrier 220 in FIG. 13, will be broken away. Thereafter, cables 460 and 462 can be "fished" through the left-hand elongated cell shown in FIG. 28, and the free ends of those cables can be passed upwardly through the collar 394. Also, a smaller cable 464 can be "fished" through the middle elongated cell shown in FIG. 28, and the free end of that cable can be passed upwardly through the collar 394. The cables 460 and 462 will be forced through the slits in the grommets 432 until they are encircled and confined by those grommets. The smaller cable 464 will be forced through the slit in the grommet 434 at the right-hand side of FIG. 29 until it is encircled and confined by that grommet. If desired, a further small conductor 464 could be "fished," and then could be forced through the slit in the other grommet 434. Once the cables 460, 462 and 464 have been suitably disposed within the passages through the grommets 432 and 434, screws 442 will be used to fixedly secure the bracket 416 to the collar 394. At such time, the screw 430 will be loosened so the horizontally-directed portion of the L-shaped extension 428 can be moved down into engagement with, or immediately adjacent to, the partition 170 in the plural-cell duct.

Thereafter, conductors 466 will be "fished" through the right-hand elongated cell of the plural-cell duct of FIG. 28 and will be passed upwardly through the collar 394. At this time, the bracket 416 will coact with its L-shaped extension 428 and with the partition 170 to effectively isolate the right-hand portion of the collar 394 from the portions of that collar in which the cables 460, 462 and 464 are located. In this way, the free ends of the conductors 466 will automatically be guided upwardly and away from the left-hand and middle elongated cells of the plural-cell duct of FIG. 28. The ends of the conductors 466 will be bared and will be suitably secured to the terminals on the duplex outlet receptacle 448; and then the strap 446, which supports that duplex outlet receptacle, will be secured to the collar 394 by the screws 450. At such time, the cover plate 452, and the grommets 458 within the slots 454 therein, will be moved adjacent the ends of the cables 460, 462 and 464; and then the end of the cable 460 will be passed through the left-hand grommet 458 in FIG. 29, and the ends of the cables 462 and 464 will be passed through the right-hand grommet 458. Thereupon, the cover plate 436 will be slid along the lengths of the cables 460, 462 and 464 until that cover plate fits into the shallow, generally-oblong recess 438 in the upper surface of the support 436 for electrical fittings. Screws 468 will then be used to hold that cover plate in position within that shallow generally-oblong recess.

The flush-type electrical fitting of FIGS. 18–20 is particularly desirable where an essentially unobstructed floor is desired for a room or other space in a building. The flush-type electrical fitting of FIGS. 22–25 is particularly desirable where a telephone cable or other cable is to be brought through the floor of a room with a minimum protrusion above the surface of that floor. The flush-type electrical fitting of FIGS. 27–32 is particularly desirable where a flush-type outlet receptacle is desired and where communication and telephone cables are to be brought upwardly out of the floor with a minimum protrusion above the surface of that floor.

FIGS. 1, 3–5, 15 and 16 show relatively small supports for electrical fittings secured to ducts which have two elongated cells therein, and FIGS. 13, 14 and 27–32 show larger supports for electrical fittings secured to ducts which have three elongated cells therein. If desired, a two-cell duct could have generally-oblong, rather than circular, openings formed in the upper wall thereof; and those openings could accommodate larger supports for electrical fittings of the type shown in FIGS. 13, 14 and 27–32.

The screws 114 in FIGS. 1–3 could be made tight enough to prevent gravity-induced downward movement of the movable portion 110 of the divider for the collar 36. Similarly, the screws 149 in FIG. 7 could be made tight enough to prevent gravity-induced downward movement of the movable portion 147 of the divider for the collar 142; and the screws 254 in FIG. 13 could be made tight enough to prevent gravity-induced downward movement of the movable portion 252 of the divider for the collar 186. However, those various screws will usually be made loose enough to permit those various movable portions to respond to gravity to automatically move downwardly until they engage, and are partially supported by, the upper edges of the partitions in the appropriate plural-cell ducts. Such automatic downward movement is desirable, because it automatically establishes the desired isolation of the cells of the plural-cell duct from each other.

Referring particularly to FIGS. 33 and 34, the numeral 470 generally denotes a barrier which resembles the barrier 62 in FIG. 12. The barrier 470 will preferably be punched out of a flat piece of sheet metal; and it is punched so it has a vertically-directed portion 472 plus a portion 478 which is displaced approximately 95 to 100° from the plane of the vertically-directed portion 472, as shown particularly by FIG. 34. Ears 474 are displaced outwardly beyond the ends of the vertically-directed portion 472; and those ears are connected to that vertically-directed portion by reduced height portions 476. The portion 478 of the barrier 470 has part of the periphery thereof denoted by the numeral 480; and that part is spaced inwardly of the inner surface of the collar 36 in which the barrier 470 will be disposed, as shown particularly by FIG. 34. The part 480 of the periphery of the portion 478 is shown as being flat; but it could be convex with a radius larger than the radius of the rest of the periphery of that portion, it could be concave, or it could be a notch. The part 480 of the periphery of the portion 478 of the barrier 470 is formed so the blade of a screwdriver can be inserted between that part and the adjacent portion of the inner surface of the collar 36.

By inserting the blade of a screwdriver in the space between the part 480 and the adjacent portion of the inner surface of the collar 36, and by then rotating that blade, an installer can force the portion 478 of the barrier 470 to tilt upwardly about an axis which extends through the reduced-height portions 476 of that barrier. By using the screwdriver or a pair of pliers or both, the installer can move the portion 478 back and forth about the axis defined by those reduced-height portions until those reduced-height portions fatigue and break. If desired, those reduced-height portions could have reduced-thickness portions, similar to the reduced-thickness portions 68 and 74 of FIG. 12, interposed between them and the vertically-directed portion 472. However, such reduced-thickness portions are not essential.

The barrier 470 is very similar to the barrier 62 in FIG. 12 — the primary differences being the elimination of the tab 76 and the provision of the part 480. The barrier 470 can be made with less metal than is required to make the barrier 62, because the tab 76 has been eliminated. The functions of the barriers 62 and 470 in initially isolating the adjacent cells of a plural cell duct are, however, identical.

Whereas the drawing and accompanying description have shown and described several preferred embodiments of the present invention, it should be apparent to those skilled in the art that various changes may be made in the form of the invention without affecting the scope thereof.

What we claim is:

1. An enclosure, for electrical conductors, which can be embedded within a portion of a building and which comprises an elongated metal duct, an elongated partition within said elongated metal duct which subdivides the interior of said elongated metal duct into a plurality of elongated cells, said elongated partition being angularly displaced from the plane of one wall of said elongated metal duct and having one edge thereof adjacent to said one wall, an opening in said one wall of said elongated metal duct which exposes a portion of said one edge of said elongated partition and also exposes adjacent portions of said elongated cells, a collar surrounding said opening and extending away from said one wall of said elongated metal duct, said collar coacting with said opening to define a potential passage which has portions thereof located within said adjacent portions of said elongated cells and which extends through said collar, and a barrier which is disposed within said passage and which occupies part of but less than all of a given cross section of said passage and which coacts with said elongated partition within said elongated metal duct to isolate one of said elongated cells from the other of said elongated cells, said barrier also effectively blocking access from the upper end of said collar to that portion of said potential passage which is located within one of said elongated cells, whereby said barrier effectively prevents access to said one of said elongated cells from a point above the upper end of said collar to a point within said one of said elongated cells, said barrier being removable from said passage without any fracturing of the wall of said collar and being bodily and cleanly removable from said passage to free said cross section of said passage from all obstructions, and thereby provide full and unobstructed access to said adjacent portions of said elongated cells via said collar.

2. An enclosure for electrical conductors as claimed in claim 1 wherein said one wall of said elongated metal duct has an upwardly-inclined flange that surrounds said opening and that extends outwardly from said one wall of said elongated metal duct and away from said elongated partition, wherein said collar has a downwardly-inclined flange at that end thereof which is adjacent said one wall of said elongated metal duct, wherein said downwardly-inclined flange on said collar abuts said upwardly-inclined flange on said one wall of said elongated metal duct, wherein a locking element which is in addition to said collar engages both said collar and said one wall of said elongated metal duct to mechanically prevent movement of said collar inwardly of said opening in said one wall of said elongated metal duct, and wherein said locking element coacts with said collar and with said one wall of said elongated metal duct to mechanically and positively prevent circumferential movement of said collar relative to said one wall of said elongated metal duct.

3. An enclosure for electrical conductors as claimed in claim 1 wherein said one wall of said elongated metal duct has an upwardly-inclined flange that surrounds said opening and that extends outwardly from said one wall of said elongated metal duct and away from said elongated partition, wherein said collar has a downwardly-inclined flange at that end thereof which is adjacent said one wall of said elongated metal duct, wherein said downwardly-inclined flange on said collar extends outwardly and away from said end of said collar, wherein said downwardly-inclined flange on said collar is disposed inwardly of and abuts the inner surface of said upwardly-inclined flange on said one wall of said elongated metal duct to mechanically prevent separating movement of said collar away from said one wall of said elongated metal duct, wherein a locking element which is in addition to said collar engages both said collar and said one wall of said elongated metal duct to mechanically prevent movement of said collar inwardly of said opening in said one wall of said elongated metal duct, whereby said collar is mechanically locked against movement relative to said one wall of said elongated metal duct, and wherein said locking element coacts with said collar and with said one wall of said elongated metal duct to mechanically and positively prevent circumferential movement of said collar relative to said one wall of said elongated metal duct.

4. An enclosure for electrical conductors as claimed in claim 1 wherein said barrier has a portion thereof which is displaced laterally from said elongated partition in said elongated metal duct and which extends upwardly and which can be grasped to enable forces to be applied to said barrier which will remove said barrier from said passage to provide full and unobstructed access to said adjacent portions of said elongated cells via said collar.

5. An enclosure for electrical conductors as claimed in claim 1 wherein readily-frangible means releasably hold said barrier in said passage, and wherein said readily-frangible means can be broken by forces exerted on said barrier through the upper end of said collar to permit removal of said barrier from said passage.

6. An enclosure, for electrical conductors, which can be embedded within concrete and which comprises an elongated metal duct, an elongated partition within said elongated metal duct which subdivides the interior of said elongated metal duct into a plurality of elongated cells, said elongated partition being angularly displaced from the plane of one wall of said elongated metal duct and having one edge thereof adjacent to said one wall, an opening in said one wall of said elongated metal duct which exposes a portion of said one edge of said elongated partition and also exposes adjacent portions of said elongated cells, a collar surrounding said opening and extending away from said one wall of said elongated metal duct, said collar coacting with said opening to define a potential passage which has portions thereof located within said adjacent portions of said elongated cells and which extends through said collar, and a closure which is removably disposed within said collar and which removably occupies substantially all of a given cross section of said collar and which overlies said adjacent portions of said elongated cells to keep said concrete from entering and blocking said adjacent portions of said elongated cells, said closure normally coacting with said elongated partition within said elongated metal duct to isolate one of said elongated cells from the other of said elongated cells, said closure being bodily and cleanly removable from said collar and from said passage without any fracturing of the wall of said collar to free said passage from all obstructions, said collar being a cold-formed portion of said one wall of said elongated metal duct so said collar and said one wall of said elongated metal duct are integral parts of the same piece of metal, whereby the combination of said collar and said one wall of said elongated metal duct is completely devoid of any line of cleavage between said collar and said one wall of said elongated metal duct.

7. An enclosure, for electrical conductors, which can be embedded within a portion of a building and which comprises an elongated metal duct, an elongated partition within said elongated metal duct which subdivides the interior of said elongated metal duct into a plurality of elongated cells, said elongated partition being angularly displaced from the plane of one wall of said elongated metal duct and having one edge thereof adjacent to said one wall, an opening in said one wall of said elongated metal duct which exposes a portion of said one edge of said elongated partition and also exposes adjacent portions of said elongated cells, a collar surrounding said opening and extending away from said one wall of said elongated metal duct, said collar coacting with said opening to define a potential passage which has portions thereof located within said adjacent portions of said elongated cells and which extends through said collar, a barrier which is disposed within said passage and which occupies at least a part of the cross section of said passage and which coacts with said elongated partition within said elongated metal duct to isolate one of said elongated cells from the other of said elongated cells, said barrier also effectively blocking access from the upper end of said collar to that portion of said potential passage which is located within one of said elongated cells, whereby said barrier effectively prevents access to said one of said elongated cells from a point above the upper end of said collar to a point within said one of said elongated cells, said barrier being removable from said passage without any fracturing of the wall of said collar and being bodily and cleanly removable from said passage to free said cross section of said passage from all obstructions, and thereby provide full and unobstructed access to said adjacent portions of said elongated cells via said collar, said one wall of said elongated metal duct having an upwardly-inclined flange that surrounds said opening and that extends outwardly from said one wall of said elongated metal duct and away from said elongated partition, said collar having a downwardly-inclined flange at that end thereof which is adjacent said one wall of said elongated metal duct, said downwardly-inclined flange on said collar abutting said upwardly-inclined flange on said one wall of said elongated metal duct, a locking element engaging said collar and extending outwardly from said collar to be embedded within said portion of said building to prevent peripheral shifting of said collar relative to said portion of said building or said one wall of said elongated metal duct, and said barrier being part of said locking element but being capable of being broken away from said locking element to free said cross section of said passage from all obstructions.

8. An enclosure, for electrical conductors, which can be embedded within a portion of a building which comprises an elongated metal duct, an elongated partition within said elongated metal duct which subdivides the interior of said elongated metal duct into a plurality of elongated cells, said elongated partition being angularly displaced from the plane of one wall of said elongated metal duct and having one edge thereof adjacent to said one wall, an opening in said one wall of said elongated metal duct which exposes a portion of said one edge of said elongated partition and also exposes adjacent portions of said elongated cells, a collar surrounding said opening and extending away from said one wall of said elongated metal duct, said collar coacting with said opening to define a potential passage which has portions thereof located within said adjacent portions of said elongated cells and which extends through said collar, a barrier which is disposed within said passage and which occupies at least a part of the cross section of said passage and which coacts with said elongated partition within said elongated metal duct to isolate one of said elongated cells from the other of said elongated cells, said barrier also effectively blocking access from the upper end of said collar to that portion of said potential passage which is located within one of said elongated cells, whereby said barrier effectively prevents access to said one of said elongated cells from a point above the upper end of said collar to a point within said one of said elongated cells, said barrier being removable from said passage without any fracturing of the wall of said collar and being bodily and cleanly removable from said passage to free said cross section of said passage from all obstructions, and thereby provide full and unobstructed access to said adjacent portions of said elongated cell via said collar, said one wall of said elongated metal duct having an upwardly-inclined flange that surrounds said opening and that extends outwardly from said one wall of said elongated metal duct and away from said elongated partition, said collar having a downwardly-inclined flange at that end thereof which is adjacent said one wall of said elongated metal duct, said downwardly-inclined flange on said collar abutting said upwardly-inclined flange on said one wall of said elongated metal duct, said downwardly-inclined flange on said collar having two spaced-apart slots therein, and a locking element extending through said spaced-apart slots in said downwardly-inclined flange on said collar and extending outwardly from said collar to be embedded within said portion of said building to prevent peripheral shifting of said collar relative to said portion of said building or said one wall of said elongated metal duct.

9. An enclosure, for electrical conductors, which can be embedded within a portion of a building and which comprises an elongated metal duct, an elongated partition within said elongated metal duct which subdivides the interior of said elongated metal duct into a plurality of elongated cells, said elongated partition being angularly displaced from the plane of one wall of said elongated metal duct and having one edge thereof adjacent to said one wall, an opening in said one wall of said elongated metal duct which exposes a portion of said one edge of said elongated partition and also exposes adjacent portions of said elongated cells, a collar surrounding said opening and extending away from said one wall of said elongated metal duct, said collar coacting with said opening to define a potential passage which has portions thereof located within said adjacent portions of said elongated cells and which extends through said collar, a barrier which is disposed within said passage and which occupies at least a part of the cross section of said passage and which coacts with said elongated partition within said elongated metal duct to isolate one of said elongated cells from the other of said elongated cells, said barrier also effectively blocking access from the upper end of said collar to that portion of said potential passage which is located within one of said elongated cells, whereby said barrier effectively prevents access to said one of said elongated cells from a point above the upper end of said collar to a point within said one of said elongated cells, said barrier being removable from said passage without any fracturing of the wall of said collar and being bodily and cleanly removable from said passage to free said cross section of said passage from all obstructions, and thereby provide full and unobstructed access to said adjacent portions of said elongated cells via said collar, said one wall of said elongated metal duct having an upwardly-inclined flange that surrounds said opening and that extends outwardly from said one wall of said elongated metal duct and away from said elongated partition, said collar having a downwardly-inclined flange at that end thereof which is adjacent said one wall of said elongated metal duct, said downwardly-inclined flange on said collar abutting said upwardly-inclined flange on said one wall of said elongated metal duct, said downwardly-inclined flange on said collar having two spaced-apart slots therein, a locking element extending through said spaced-apart slots in said downwardly-inclined flange on said collar and extending outwardly from said collar to be embedded within said portion of said building to prevent peripheral shifting of said collar relative to said portion of said building or said one wall of said elongated metal duct, and said barrier being part of said locking element but being capable of being broken away from said locking element to free said cross section of said passage from all obstructions.

10. An enclosure, for electrical conductors, which can be embedded within a portion of a building and which comprises an elongated metal duct, an elongated partition within said elongated metal duct which subdivides the interior of said elongated metal duct into a plurality of elongated cells, said elongated partition being angularly displaced from the plane of one wall of said elongated metal duct and having one edge thereof adjacent to said one wall, an opening in said one wall of said elongated metal duct which exposes a portion of said one edge of said elongated partition and also exposes adjacent portions of said elongated cells, a collar surrounding said opening and extending away from said one wall of said elongated metal duct, said collar coacting with said opening to define a potential passage which has portions thereof located within said adjacent portions of said elongated cells and which extends through said collar, a barrier which is disposed within said passage and which occupies at least a part of the cross section of said passage and which coacts with said elongated partition within said elongated metal duct to isolate one of said elongated cells from the other of said elongated cells, said barrier also effectively blocking access from the upper end of said collar to that portion of said potential passage which is located within one of said elongated cells, whereby said barrier effectively prevents access to said one of said elongated cells from a point above the upper end of said collar to a point within said one of said elongated cells, said barrier being removable from said passage without any fracturing of the wall of said collar and being bodily and cleanly removable from said passage to free said cross section of said passage from all obstructions, and thereby provide full and unobstructed access to said adjacent portions of said elongated cells via said collar, said one wall of said elongated metal duct having an upwardly-inclined flange that surrounds said opening and that extends outwardly from said one wall of said elongated metal duct and away from said elongated partition, said collar having a downwardly-inclined flange at that end thereof which is adjacent said one wall of said elongated metal duct, said downwardly-inclined flange on said collar abutting said upwardly-inclined flange on said one wall of said elongated metal duct, a locking element engaging said collar and extending outwardly from said collar to be embedded within said portion of said building to prevent peripheral shifting of said collar relative to said portion of said building or said one wall of said elongated metal duct said barrier being part of said locking element, and said locking element having readily-frangible portions adjacent said barrier to enable said barrier to be cleanly broken away from said locking element to free said central area of said collar from all obstructions.

11. An enclosure, for electrical conductors, which can be embedded within a portion of a building and which comprises an elongated metal duct, an elongated partition within said elongated metal duct which subdivides the interior of said elongated metal duct into a plurality of elongated cells, said elongated partition being angularly displaced from the plane of one wall of said elongated metal duct and having one edge thereof adjacent to said one wall, an opening in said one wall of said elongated metal duct which exposes a portion of said one edge of said elongated partition and also exposes adjacent portions of said elongated cells, a collar surrounding said opening and extending away from said one wall of said elongated metal duct, said collar coacting with said opening to define a potential passage which has portions thereof located within said adjacent portions of said elongated cells and which extends through said collar, a barrier which is disposed within said passage and which occupies at least a part of the cross section of said passage and which coacts with said elongated partition within said elongated metal duct to isolate one of said elongated cells from the other of said elongated cells, said barrier also effectively blocking access from the upper end of said collar to that portion of said potential passage which is located within one of said elongated cells, whereby said barrier effectively prevents access to said one of said elongated cells from a point above the upper end of said collar to a point within said one of said elongated cells, said barrier being removable from said passage without any fracturing of the wall of said collar and being bodily and cleanly removable from said passage to free said cross section of said passage from all obstructions, and thereby provide full and unobstructed access to said adjacent portions of said elongated cells via said collar, said barrier having a portion thereof aligned with and effectively acting as a continuation of said elongated partition within said elongated metal duct, and said barrier having a second portion thereof which is angularly displaced from the first said portion of said barrier and which overlies and effectively closes the exposed portion of said one of said elongated cells.

12. An enclosure, for electrical conductors, which can be embedded within concrete and which cmmprises an elongated metal duct, an elongated partition within said elongated metal duct which subdivides the interior of said elongated metal duct into a plurality of elongated cells, said elongated partition being angularly displaced from the plane of one wall of said elongated metal duct and having one edge thereof adjacent to said one wall, and opening in said one wall of said elongated metal duct which exposes a portion of said one edge of said elongated partition and also exposes adjacent portions of said elongated cells, a collar surrounding said opening and extending away from said one wall of said elongated metal duct, said collar coacting with said opening to define a potential passage which has portions thereof located within said adjacent portions of said elongated cells and which extends through said collar, a closure removably disposed within said collar to initially close said collar and thereby keep concrete which is poured around said elongated metal duct and around said collar from entering said elongated metal duct via said collar, said closure being removable to provide access to the interior of said collar, and a divider on said closure which is removable with said closure, said divider coacting with said elongated partition within said elongated metal duct to isolate one of said elongated cells from the other of said elongated cells as long as said closure is disposed within said collar.

13. An enclosure, for electrical conductors, which can be embedded within a portion of a building and which comprises an elongated metal duct, an elongated partition within said elongated metal duct which subdivides the interior of said elongated metal duct into a plurality of elongated cells, said elongated partition being angularly displaced from the plane of one wall of said elongated metal duct and having one edge thereof adjacent to said one wall, an opening in said one wall of said elongated metal duct which exposes a portion of said one edge of said elongated partition and also exposes adjacent portions of said elongated cells, a collar surrounding said opening and extending away from said one wall of said elongated metal duct, said collar coacting with said opening to define a potential passage which has portions thereof located within said adjacent portions of said elongated cells and which extends through said collar, a divider which is disposed within said passage and which occupies at least a part of the cross section of said passage and which coacts with said elongated partition within said elongated metal duct to isolate one of said elongated cells from the other of said elongated cells, said divider being removable from said passage without any fracturing of the wall of said collar and being bodily and cleanly removable from said passage to free said cross section of said passage from all obstructions, and thereby provide full and unobstructed access to said adjacent portions of said elongated cells via said collar, said divider having one portion thereof aligned with and effectively acting as a continuation of said elongated partition within said elongated metal duct, further portions of said divider underlying said one wall of said elongated metal duct to help prevent accidental separation of said divider from said one wall of said elongated metal duct, and still further portions of said divider extending over and engaging the exposed edge of said elongated partition within said elongated metal duct to additionally help prevent accidental separation of said divider from said one wall of said elongated metal duct.

14. An enclosure, for electrical conductors, which can be embedded within a portion of a building and which comprises an elongated metal duct, an elongated partition within said elongated metal duct which subdivides the interior of said elongated metal duct into a plurality of elongated cells, said elongated partition being angularly displaced from the plane of one wall of said elongated metal duct and having one edge thereof adjacent to said one wall, an opening in said one wall of said elongated metal duct which exposes a portion of said one edge of said elongated partition and also exposes adjacent portions of said elongated cells, a collar surrounding said opening and extending away from said one wall of said elongated metal duct, said collar coacting with said opening to define a potential passage which has portions thereof located within said adjacent portions of said elongated cells and which extends through said collar, a divider which is disposed within said passage and which occupies at least a part of the cross section of said passage and which coacts with said elongated partition within said elongated metal duct to isolate one of said elongated cells from the other of said elongated cells, said divider being removable from said passage without any fracturing of the wall of said collar and being bodily and cleanly removable from said passage to free said cross section of said passage from all obstructions, and thereby provide full and unobstructed access to said adjacent portions of said elongated cells via said collar said divider having one portion thereof aligned with and effectively acting as a continuation of said elongated partition within said elongated metal duct, further portions of said divider underlying said one wall of said elongated metal duct to help prevent accidental separation of said divider from said one wall of said elongated metal duct, still further portions of said divider extending over and engaging the exposed edge of said elongated partition within said elongated metal duct to additionally help prevent accidental separation of said divider from said one wall of said elongated metal duct, said further portions of said divider being disposed at one face of said elongated partition within said elongated metal duct, said still further portions of said divider being disposed at the opposite face of said elongated partition within said elongated metal duct, and said divider being selectively securable to or removable from said elongated partition within said elongated metal duct by rotating said divider about said exposed edge of said elongated partition within said elongated metal duct.

15. An enclosure, for electrical conductors, which can be embedded within concrete and which comprises an elongated metal duct, an elongated partition within said elongated metal duct which subdivides the interior of said elongated metal duct into a plurality of elongated cells, said elongated partition being angularly displaced from the plane of one wall of said elongated metal duct and having one edge thereof adjacent to said one wall, an opening in said one wall of said elongated metal duct which exposes a portion of said one edge of said elongated partition and also exposes adjacent portions of said elongated cells, a collar surrounding said opening and extending away from said one wall, an upwardly-inclined flange that surrounds said opening and that extends outwardly from said one wall of said elongated metal duct and away from said elongated partition, that end of said collar which is adjacent said one wall of said elongated metal duct having a slot therein, and a locking element which has a portion thereof extending through and projecting laterally outwardly beyond said slot in said end of said collar and overlying said one wall of said elongated metal duct, said locking element having said portion thereof adapted to be exposed to and adapted to be embedded by said concrete to prevent shifting of said locking element relative to said collar and to prevent rotation of said collar relative to said elongated metal duct after said concrete has been placed and permitted to set.

16. An enclosure, for electrical conductors, which can be embedded within concrete and which comprises an elongated metal duct, an elongated partition within said elongated metal duct which subdivides the interior of said elongated metal duct into a plurality of elongated cells, said elongated partition being angularly displaced from the plane of one wall of said elongated metal duct and having one edge thereof adjacent to said one wall, an opening in said one wall of said elongated metal duct which exposes a portion of said one edge of said elongated partition and also exposes adjacent portions of said elongated cells, a collar surrounding said opening and extending away from said one wall, an upwardly-inclined flange that surrounds said opening and that extends outwardly from said one wall of said elongated metal duct and away from said elongated partition, a downwardly-inclined flange at that end of said collar which is adjacent said one wall of said elongated metal duct, a locking element which engages said collar and overlies said one wall of said elongated metal duct, said locking element having a portion thereof which is exposed to and which will be embedded by said concrete to prevent shifting of said locking element relative to said collar and also to prevent peripheral shifting of said collar relative to said concrete after said concrete has been placed and permitted to set, said downwardly-inclined flange on said end of said collar having a surface thereon which is adjacent a surface on said locking member, one of said surfaces having a slot therein to permit said locking member to extend both inwardly and outwardly of said downwardly-inclined flange on said collar, said upwardly-inclined flange on said one wall of said elongated metal duct having a further surface thereon which is adjacent a further surface on said locking member, one of further surfaces having a slot therein to permit said locking member to extend both inwardly and outwardly of said upwardly-inclined flange on said one wall of said elongated metal duct, said surface on said downwardly-inclined flange on said collar being in register with said further surface on said upwardly-inclined flange on said one wall of said elongated metal duct, and said portion of said locking element being disposed outwardly beyond the first said and said further surfaces on said locking element and also being disposed outwardly beyond said surface on said downwardly inclined flange on said collar and said further surface on said upwardly-inclined flange on said one wall of said elongated metal duct.

17. An enclosure, for electrical conductors, which can be embedded within concrete and which comprises an elongated metal duct, an elongated partition within said elongated metal duct which subdivides the interior of said elongated metal duct into a plurality of elongated cells, said elongated partition being angularly displaced from the plane of one wall of said elongated metal duct and having one edge thereof adjacent to said one wall, an opening in said one wall of said elongated metal duct which exposes a portion of said one edge of said elongated partition and also exposes adjacent portions of said elongated cells, a collar surrounding said opening and extending away from said one wall, an upwardly-inclined flange that surrounds said opening and that extends outwardly from said one wall of said elongated metal duct and away from said elongated partition, that end of said collar which is adjacent said one wall of said elongated metal duct having a slot therein, a locking element which has a portion thereof extending through and projecting laterally outwardly beyond said slot in said end of said one wall of said elongated metal duct, said locking element having said portion thereof adapted to be exposed to and adapted to be embedded by said concrete to prevent shifting of said locking element relative to said collar and to prevent rotation of said collar relative to said elongated metal duct after said concrete has been placed and permitted to set, a barrier supported on said locking element, and said barrier coacting with said elongated partition to isolate one of said elongated cells from the other of said elongated cells.

18. An enclosure, for electrical conductors, which can be embedded within concrete and which comprises an elongated metal duct, an elongated partition within said elongated metal duct which subdivides the interior of said elongated metal duct into a plurality of elongated cells, said elongated partition being angularly displaced from the plane of one wall of said elongated metal duct and having one edge thereof adjacent to said one wall, an opening in said one wall of said elongated metal duct which exposes a portion of said one edge of said elongated partition and also exposes adjacent portions of said elongated cells, a collar surrounding said opening and extending away from said one wall, an upwardly-inclined flange that surrounds said opening and that extends outwardly from said one wall of said elongated metal duct and away from said elongated partition, that end of said collar which is adjacent said one wall of said elongated metal duct having a slot therein, a locking element which has a portion thereof extending through and projecting laterally outwardly beyond said slot in said end of said collar and overlying said one wall of said elongated metal duct, said locking element having said portion thereof adapted to be exposed to and adapted to be embedded by said concrete to prevent shifting of said locking element relative to said collar and to prevent rotation of said collar relative to said elongated metal duct after said concrete has been placed and permitted to set, a barrier supported on said locking element, said barrier coacting with said elongated partition to isolate one of said elongated cells from the other of said elongated cells, and said barrier being movable away from said elongated partition to provide access to said one elongated cell.

19. An enclosure, for electrical conductors, which can be embedded within concrete and which comprises an elongated metal duct, an elongated partition within said elongated metal duct which subdivides the interior of said elongated metal duct into a plurality of elongated cells, said elongated partition being angularly displaced from the plane of one wall of said elongated metal duct and having one edge thereof adjacent to said one wall, an opening in said one wall of said elongated metal duct which exposes a portion of said one edge of said elongated partition and also exposes adjacent portions of said elongated cells, a collar surrounding said opening and extending away from said one wall, an upwardly-inclined flange that surrounds said opening and that extends outwardly from said one wall of said elongated metal duct and away from said elongated partition, that end of said collar which is adjacent said one wall of said elongated metal duct having a slot therein, a locking element which has a portion thereof extending through and projecting laterally outwardly beyond said slot in said end of said collar and overlying said one wall of said elongated metal duct, said locking element having said portion thereof adapted to be exposed to and adapted to be embedded by said concrete to prevent shifting of said locking element relative to said collar and to prevent rotation of said collar relative to said elongated metal duct after said concrete has been placed and permitted to set, a barrier which is part of said locking member, said barrier coacting with said elongated partition to isolate one of said elongated cells from the other of said elongated cells, said locking member having readily-frangible portions adjacent said barrier, and said readily-frangible portions of said locking member being capable of being broken to separate said barrier from said locking member to provide access to said one elongated cell.

20. An enclosure, for electrical conductors, which can be embedded within a portion of a building and which comprises an elongated metal duct, an elongated partition within said elongated metal duct which subdivides the interior of said elongated metal duct into a plurality of elongated cells, said elongated partition being angularly displaced from the plane of said elongated metal duct and having one edge thereof adjacent to said one wall, an opening in said one wall of said elongated metal duct which exposes a portion of said one edge of said elongated partition and also exposes adjacent portions of said elongated cells, a collar surrounding said opening and extending away from said one wall, said collar coacting with said opening to define a potential passage which has portions thereof located within said adjacent portions of said elongated cells and which extends through said collar, and a barrier which is disposed within said passage and which occupies at least a part of the cross-section of said passage and which coacts with said elongated partition within said elongated metal duct to isolate one of said elongated cells from the other of said elongated cells, said barrier effectively blocking access from the upper end of said collar to that portion of said potential passage which is located within one of said elongated cells, whereby said barrier effectively prevents access to said one of said elongated cells from a point above the upper end of said collar to a point within said one of said elongated cells, said barrier and said elongated partition having interacting surfaces thereon which enable said barrier to be supported by said elongated partition.

21. An enclosure for electrical conductors as claimed in claim 20 wherein said barrier is removable from said elongated partition without any injury to or impairment of said collar or of said elongated partition, and wherein said barrier is removable from said elongated partition and can be withdrawn through the upper end of said collar to free said cross section of said passage from all obstructions, and thereby provide full and unobstructed access to said adjacent portions of said elongated cells via said collar.

22. An enclosure, for electrical conductors, which can be embedded within a portion of a building and which comprises an elongated metal duct, an elongated partition within said elongated metal duct which subdivides the interior of said elongated metal duct into a plurality of elongated cells, said elongated partition being angularly displaced from the plane of one wall of said elongated metal duct and having one edge thereof adjacent to said one wall, an opening in said one wall of said elongated metal duct which exposes a portion of said one edge of said elongated partition and also exposes adjacent portions of said elongated cells, a collar surrounding said opening and extending away from said one wall, said collar coacting with said opening to define a potential passage which has portions thereof located within said adjacent portions of said elongated cells and which extends through said collar, a barrier which is disposed within said passage and which occupies at least a part of the cross section of said passage and which coacts with said elongated partition within said elongated metal duct to isolate one of said elongated cells from the other of said elongated cells, said barrier being supported by said elongated partition, said barrier having a portion which engages and grips one side of said elongated partition, and said barrier having a further portion which engages and grips the opposite side of said elongated partition.

23. An enclosure, for electrical conductors, which can be embedded within a portion of a building and which comprises an elongated metal duct, an elongated partition within said elongated metal duct which subdivides the interior of said elongated metal duct into a plurality of elongated cells, said elongated partition being angularly displaced from the plane of one wall of said elongated metal duct and having one edge thereof adjacent to said one wall, an opening in said one wall of said elongated metal duct which exposes a portion of said one edge of said elongated partition and also exposes adjacent portions of said elongated cells, a collar surrounding said opening and extending away from said one wall, said collar coacting with said opening to define a potential passage which has portions thereof located within said adjacent portions of said elongated cells and which extends through said collar, a divider which is disposed within said passage and which occupies at least a part of the cross section of said passage and which coacts with said elongated partition within said elongated metal duct to isolate one of said elongated cells from the other of said elongated cells, said divider and said elongated partition having interacting surfaces thereon which enable said divider to be supported by said elongated partition, and said divider having portions which underlie said one wall of said elongated metal duct to keep said divider from being accidentally separated from said elongated partition.

24. An enclosure, for electrical conductors, which can be embedded within a portion of a building and which comprises an elongated metal duct, an elongated partition within said elongated metal duct which subdivides the interior of said elongated metal duct into a plurality of elongated cells, said elongated partition being angularly displaced from the plane of one wall of said elongated metal duct and having one edge thereof adjacent to said one wall, an opening in said one wall of said elongated metal duct which exposes a portion of said one edge of said elongated partition and also exposes adjacent portions of said elongated cells, a collar surrounding said opening and extending away from said one wall, said collar coacting with said opening to define a potential passage which has portions thereof located within said adjacent portions of said elongated cells and which extends through said collar, a barrier which is disposed within said passage and which occupies at least a part of the cross section of said passage and which coacts with said elongated partition within said elongated metal duct to isolate one of said elongated cells from the other of said elongated cells, said barrier being supported by said elongated partition, said barrier having one portion thereof aligned with and effectively acting as a continuation of said elongated partition within said elongated metal duct, and said barrier having a second portion thereof which is angularly displaced from the first said portion of said barrier and which overlies and effectively closes the exposed portion of said one of said elongated cells.

25. An enclosure, for electrical conductors, which can be embedded within a portion of a building and which comprises an elongated metal duct, an opening in one wall of said elongated metal duct, a collar surrounding said opening and extending away from one wall of said elongated metal duct, an ear at the interior of said collar, an opening in the wall of said collar which is adjacent said ear and which has essentially the same configuration as said ear, said ear and said opening being adjacent that end of said collar which extends away from said one wall of said elongated metal duct, and a cup-shaped closure which has a generally-cylindrical portion and a web-like portion, said cup-shaped closure being disposed within said end of said collar which extends away from said one wall of said elongated metal duct, said web-like portion of said cup-shaped closure being adjacent said ear and being limited against movement inwardly of said collar by said ear, said generally-cylindrical portion of said cup-shaped closure being adjacent and effectively closing said opening in said wall of said collar, whereby said cup-shaped closure can effectively keep concrete which is poured around said elongated metal duct and around said collar from entering said elongated metal duct via said collar.

26. An enclosure for electrical conductors as claimed in claim 25 wherein said cup-shaped closure is removable from said end of said collar which extends away from said one wall of said elongated metal duct to provide access to the interior of said collar and also to provide access to said ear.

27. An enclosure, for electrical conductors, which can be embedded within a portion of a building and which comprises an elongated metal duct, an opening in one wall of said elongated metal duct, a collar surrounding said opening and extending away from said one wall of said elongated metal duct, an ear at the interior of said collar which extends inwardly of said collar, said ear having an opening therein which is generally parallel to the axis of said collar and which has a portion thereof immediately adjacent the inner surface of said collar, a support for an electrical fitting which is securable to said collar by a screw extending through said opening in said ear, the thread of said screw biting into that portion of said inner surface of said collar which is adjacent said opening in said ear as said screw passes through said ear to secure said support in assembled relation with said collar, the biting of said thread of said screw into said portion of said inner surface of said collar providing effective electrical grounding of said support to said collar.

28. An enclosure, for electrical conductors, which can be embedded within a portion of a building and which comprises an elongated metal duct, an elongated partition within said elongated metal duct which subdivides the interior of said elongated metal duct into a plurality of elongated cells, said elongated partition being angularly displaced from the plane of one wall of said elongated metal duct and having one edge thereof adjacent to said one wall, an opening in said one wall of said elongated metal duct which exposes a portion of said one edge of said elongated partition and also exposes adjacent portions of said elongated cells, a collar surrounding said opening and extending away from said one wall of said elongated metal duct, said collar coacting with said opening to define a potential passage which has portions thereof located within said adjacent portions of said elongated cells and which extends through said collar, a support for an electrical fitting which is securable to said collar, and a divider which is carried by said support and which extends downwardly through said collar to a point adjacent said elongated partition within said elongated metal duct, said divider having a fixed portion which is held stationary relative to said support, said divider having a slidable portion which is movable relative to said stationary portion of said divider and relative to said support and said collar and said elongated partition within said elongated metal duct, said stationary portion of said divider being secured to said support and said support being secured to said collar so said slidable portion of said divider is aligned with and can effectively act as a continuation of said elongated partition within said elongated metal duct, said divider having means securing said slidable portion of said divider to said stationary portion of said divider but permitting said slidable portion of said divider to be moved toward and to engage said elongated partition within said elongated metal duct, said divider being adapted to accommodate variations in the distance between said collar and said support which are caused by different thicknesses of said portion of said building.

29. An enclosure for electrical conductors as claimed in claim 28 wherein said stationary portion of said divider has laterally-extending areas thereof telescoped into and tightly held by slots in the walls of said support.

30. An enclosure for electrical conductors as claimed in claim 28 wherein said means renders the engagement between said slidable portion of said divider and said stationary portion of said divider loose enough to permit said slidable portion of said divider to respond to its own weight to move relative to said stationary portion of said divider and said collar and said elongated partition within said elongated metal duct, whereby said slidable portion of said divider will automatically move into engagement with said elongated partition within said elongated metal duct.

31. An enclosure, for electrical conductors, which can be embedded within a portion of a building and which comprises an elongated metal duct, an elongated partition with said elongated metal duct which subdivides the interior of said elongated metal duct into a plurality of elongated cells, said elongated partition being angularly displaced from the plane of one wall of said elongated metal duct and having one edge thereof adjacent to said one wall, an opening in said one wall of said elongated metal duct which exposes a portion of said one edge of said elongated partition and also exposes adjacent portions of said elongated cells, a collar surrounding said opening and extending away from said one wall of said elongated metal duct, said collar coacting with said opening to define a potential passage which has portions thereof located within said adjacent portions of said elongated cells and which extends through said collar, a barrier which is disposed within said passage and which occupies at least a part of the cross section of said passage and which coacts with said elongated partition within said elongated metal duct to isolate one of said elongated cells from the other of said elongated cells, said barrier also effectively blocking access from the upper end of said collar to that portion of said potential passage which is located within one of said elongated cells, whereby said barrier effectively prevents access to said one of said elongated cells from a point above the upper end of said collar to a point within said one of said elongated cells, said barrier being removable from said passage without any fracturing of the wall of said collar and being bodily and cleanly removable from said passage to free said cross section of said passage from all obstructions, and thereby provide full and unobstructed access to said adjacent portions of said elongated cells via said collar, said barrier having one portion thereof aligned with and effectively acting as a continuation of said elongated partition within said elongated metal duct, said barrier having a second portion thereof which is angularly displaced from the first said portion of said barrier and which overlies and effectively closes the exposed portion of said one of said elongated cells, readily-frangible means holding said barrier in said passage, and said readily-frangible means being capable of being broken to permit removal of said barrier from said passage.

32. An enclosure, for electrical conductors, which can be embedded within a portion of a building and which comprises an elongated metal duct, an elongated partition within said elongated metal duct which subdivides the interior of said elongated metal duct into a plurality of elongated cells, said elongated partition being angularly displaced from the plane of one wall of said elongated metal duct and having one edge thereof adjacent to said one wall, an opening in said one wall of said elongated metal duct which exposes a portion of said one edge of said elongated partition and also exposes adjacent portions of said elongated cells, a collar surrounding said opening and extending away from said one wall of said elongated metal duct, said collar coacting with said opening to define a potential passage which has portions thereof located within said adjacent portions of said elongated cells and which extends through said collar, that end of said collar which is adjacent said opening in said one wall of said elongated metal duct having a surface thereon, a locking element which has a surface thereon that is adjacent said surface on said end of said collar, one of said surfaces having a slot therein to permit said locking member to extend both inwardly and outwardly of said one end of said collar, said locking member having a portion thereof that extends outwardly beyond said end of said collar and overlies said one wall of said elongated metal duct, said portion of said locking element being adapted to be engaged by and to be embedded within said portion of said building to help prevent rotation of said collar relative to said one wall of said elongated metal duct, and a barrier which is supported by said locking member and which is disposed within said passage and which coacts with said elongated partition to isolate one of said elongated cells from the other of said elongated cells, said barrier being separable from said locking member to permit removal of said barrier from said passage.

33. An enclosure for electrical conductors as claimed in claim 32 wherein said locking member has readily-frangible poritons adjacent said barrier, and wherein said readily-frangible portions of said locking member can be broken away to free said barrier from said locking element and thus from said passage.

34. An enclosure, for electrical conductors, which can be embedded within a portion of a building and which comprises an elongated metal duct, one wall of said elongated metal duct having an opening therein, a collar surrounding said opening and extending away from said one wall of said elongated metal duct, an upwardly-inclined flange on said one wall of said elongated metal duct that surrounds said opening and that extends outwardly from said one wall of said elongated metal duct, a downwardly-inclined flange at that end of said collar which is adjacent said one wall of said elongated metal duct, and an abutment on said collar which is spaced a short distance from said downwardly-inclined flange on said collar, said downwardly-inclined flange on said collar being disposed within and abutting the inner surface of said upwardly-inclined flange on said one wall of said elongated metal duct to mechanically prevent separating movement of said collar away from said one wall of said elongated metal duct, said abutment on said collar engaging the upper surface of said upwardly-inclined flange on said one wall of said elongated metal duct to mechanically prevent movement of said collar inwardly of said opening in said one wall of said elongated metal duct.

35. An enclosure for electrical conductors as claimed in claim 34 wherein a locking element engages said collar and said one wall of said elongated metal duct to additionally prevent movement of said collar inwardly of said opening in said one wall of said elongated metal duct.

36. An enclosure, for electrical conductors, which can be embedded within a portion of a building and which comprises an elongated metal duct, an elongated partition within said elongated metal duct which subdivides the interior of said elongated metal duct into a plurality of elongated cells, said elongated partition being angularly displaced from the plane of one wall of said elongated metal duct and having one edge thereof adjacent to said one wall, an opening in said one wall of said elongated metal duct which exposes a portion of said one edge of said elongated partition and also exposes adjacent portions of said elongated cells, a collar fixedly secured to said one wall of said elongated metal duct and surrounding said opening and extending away from said one wall of said elongated metal duct, a flush-type support for an electrical fitting which is securable to that end of said collar which extends away from said one wall of said elongated metal duct, removable means initially disposed within said collar to coact with said elongated partition within said elongated metal duct to provide initial isolation of one of said elongated cells from an adjacent elongated cell, said removable means being readily removable from said collar without any fracturing of the wall of said collar to expose both of said elongated cells to flush-type support, said flush-type support being dimensioned to extend laterally outwardly beyond the sides of said collar to overlie those parts of the surface of said portion of said building in which said enclosure is embedded, said collar having the central portions of the middle and of said end thereof effectively free of permanent obstructions so the removal of said removable means will enable said middle and said end of said collar to accommodate said electrical fitting, said flush-type support being adapted to hold a portion of said electrical fitting within said end of said collar, and elongated fasteners adapted to extend from said flush-type support to said collar to hold said flush-type support against movement relative to said collar although said portion of said building spaces said flush-type support outwardly from said end of said collar.

37. An enclosure, for electrical conductors, which can be embedded within a portion of a building and which comprises an elongated metal duct, an elongated partition within said elongated metal duct which subdivides the interior of said elongated metal duct into a plurality of elongated cells, said elongated partition being angularly displaced from the plane of one wall of said elongated metal duct and having one edge thereof adjacent to said one wall, an opening in said one wall of said elongated metal duct which exposes a portion of said one edge of said elongated partition and also exposes adjacent portions of said elongated cells, a collar fixedly secured to said one wall of said elongated metal duct and surrounding said opening and extending away from said one wall of said elongated metal duct, a flush-type support for an electrical fitting which is securable to that end of said collar which extends away from said one wall of said elongated metal duct, said collar having the central portions of the middle and of said end thereof effectively free of permanent obstructions to enable said middle and said end of said collar to accommodate said electrical fitting, said flush-type support being adapted to hold a portion of said electrical fitting within said end of said collar but out of engagement with said elongated partition within said elongated metal duct, and isolating means adjacent that end of said collar which is adjacent said one wall of said elongated metal duct, said isolating means being spaced from and not interfering with said flush-type support or said electrical fitting, said isolating means effectively coacting with said elongated partition within said elongated metal duct to isolate one of said elongated cells within said elongated metal duct from an adjacent elongated cell within said elongated metal duct.

38. An enclosure, for electrical conductors, which can be embedded within a portion of a building and which comprises an elongated metal duct, an elongated partition within said elongated metal duct which subdivides the interior of said elongated metal duct into a plurality of elongated cells, said elongated partition being angularly displaced from the plane of one wall of said elongated metal duct and having one edge thereof adjacent to said one wall, an opening in said one wall of said elongated metal duct which exposes a portion of said one edge of said elongated partition and also exposes adjacent portions of said elongated cells, a collar surrounding said opening and extending away from said one wall of said elongated metal duct, said collar coacting with said opening to define a potential passage which has portions thereof located within said adjacent portions of said elongated cells and which extends through said collar, a barrier which is disposed within said passage and which occupies at least a part of the cross section of said passage and which coacts with said elongated partition within said elongated metal duct to isolate one of said elongated cells from the other of said elongated cells, said barrier also effectively blocking access from the upper end of said collar to that portion of said potential passage which is located within one of said elongated cells, whereby said barrier effectively prevents access to said one of said elongated cells from a point above the upper end of said collar to a point within said one of said elongated cells, said barrier being removable from said passage without any fracturing of the wall of said collar and being bodily and cleanly removable from said passage to free said cross section of said passage from all obstructions, and thereby provide full and unobstructed access to said adjacent portions of said elongated cells via said collar, said barrier having a portion thereof aligned with and effectively acting as a continuation of said elongated partition within said elongated metal duct, said barrier having a second portion thereof which is angularly displaced from the first said portion of said barrier and which overlies and effectively closes the exposed portion of said one of said elongated cells, said second portion of said barrier having a part thereof which is spaced from the adjacent portion of the interior of said collar by a distance which enables the blade of a screwdriver to be inserted between said part of said second portion of said barrier and said adjacent portion of said interior of said collar, and said second portion of said barrier inclining upwardly from said first said portion of said barrier toward said adjacent portion of said interior of said collar, whereby twisting of said blade of said screwdriver can tilt said second portion of said barrier upwardly toward the upper end of said collar.

* * * * *